(12) United States Patent
Kayama et al.

(10) Patent No.: US 7,195,000 B2
(45) Date of Patent: Mar. 27, 2007

(54) FUEL INJECTOR DESIGNED TO OPTIMIZE PATTERN OF FUEL SPRAY

(75) Inventors: Ryozo Kayama, Susono (JP); Hideki Suzuki, Aichi-ken (JP); Tetsuharu Matsuo, Aichi-ken (JP); Yukio Tomiita, Anjo (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/113,325

(22) Filed: Apr. 25, 2005

(65) Prior Publication Data

US 2005/0235961 A1 Oct. 27, 2005

(30) Foreign Application Priority Data

Apr. 23, 2004 (JP) ............... 2004-127924

(51) Int. Cl.
*F02M 61/14* (2006.01)
*G06F 17/00* (2006.01)

(52) U.S. Cl. ............. 123/432; 123/302; 123/305; 123/308

(58) Field of Classification Search ......... 123/301, 123/302, 305, 308, 432, 467; 239/533.12
See application file for complete search history.

(56) References Cited

U.S. PATENT DOCUMENTS

| | | | | |
|---|---|---|---|---|
| 4,771,948 A | * | 9/1988 | Furukawa et al. | 239/533.12 |
| 4,773,374 A | * | 9/1988 | Kiuchi et al. | 123/470 |
| 5,027,778 A | * | 7/1991 | Nogi et al. | 123/472 |
| 5,138,989 A | * | 8/1992 | Fraidl et al. | 123/193.5 |
| 5,156,130 A | * | 10/1992 | Soma | 123/472 |
| 5,224,458 A | * | 7/1993 | Okada et al. | 123/531 |
| 5,501,194 A | * | 3/1996 | Kanehara et al. | 123/470 |
| 5,577,481 A | * | 11/1996 | Wahba | 123/470 |

(Continued)

FOREIGN PATENT DOCUMENTS

DE         4447938 B4       3/2005

(Continued)

OTHER PUBLICATIONS

"Emission Reduction Below ULEV-Level for a DC-Test Engine, Effect of Optimized Condition at Engine Start and Right After Start" by W. Samenfink et al.; 8th Aachen colloquium; Oct. 1999; pp. 1-17(w/partial English translation).

(Continued)

*Primary Examiner*—Hai Huynh
(74) *Attorney, Agent, or Firm*—Nixon & Vanderhye PC

(57) ABSTRACT

A fuel injector for an internal combustion engine which has a spray hole designed geometrically to produce a spray of fuel so that substantially 70% or more of an amount of the spray hits a preselected area of a head of an intake valve of the engine when the intake valve is closed. The preselected area is one of a first and a second area of the intake valve head which are defined by a reference boundary line extending through a base end of a stem of the intake valve. The preselected area is the first area closer to an intake manifold, while the second area is closer to an exhaust valve. This avoids rich misfire and reduces HC emissions from the engine regardless of the intake valve is in a closed state or in an open state.

20 Claims, 19 Drawing Sheets

U.S. PATENT DOCUMENTS

| | | | |
|---|---|---|---|
| 5,645,029 | A | 7/1997 | Ohsuga et al. |
| 5,915,358 | A * | 6/1999 | Muller ........................ 123/432 |
| 6,032,652 | A * | 3/2000 | Nozawa et al. ............. 123/478 |
| 6,089,476 | A * | 7/2000 | Sugimoto et al. ........... 239/596 |
| 6,588,399 | B2 * | 7/2003 | Okamoto et al. ........... 123/305 |
| 6,616,071 | B2 * | 9/2003 | Kitamura et al. ...... 239/533.12 |
| 6,659,054 | B2 * | 12/2003 | Sugiyama et al. ....... 123/90.16 |
| 6,854,448 | B2 * | 2/2005 | Okamoto et al. ........... 123/470 |
| 6,918,372 | B2 * | 7/2005 | Nishii et al. ................ 123/306 |
| 2001/0022170 | A1 | 9/2001 | Okamoto et al. |
| 2004/0164187 | A1* | 8/2004 | Kihara et al. ................ 239/552 |
| 2005/0139195 | A1* | 6/2005 | Kuriki et al. ................ 123/432 |

FOREIGN PATENT DOCUMENTS

| | | |
|---|---|---|
| EP | 0781918 A1 | 7/1997 |
| EP | 1201917 A2 | 5/2002 |
| JP | 03-124959 | 5/1991 |
| JP | 03-185266 | 8/1991 |
| JP | 3-129772 | 12/1991 |
| JP | 4-121435 | 4/1992 |
| JP | 4-159452 | 6/1992 |
| JP | 6-101603 | 4/1994 |
| JP | 08-218986 | 8/1996 |
| JP | 09-112320 | 4/1997 |
| JP | 2002-202031 | 7/2002 |

OTHER PUBLICATIONS

Patent Abstracts of Japan, vol. 011, No. 078, Mar. 10, 1987 & JP 61 234266 A, Oct. 18, 1986.
Patent Abstracts of Japan, vol. 1996, No. 12, Dec. 26, 1996 & JP 08 218986, Aug. 27, 1996.
Patent Abstracts of Japan, May 23, 1995, 07-133727.
Japanese Office Action dated Sep. 8, 2006 issued in counterpart Japanese Application No. 2004-127924 with English translation.
Japanese Office Action dated Nov. 30, 2006 issued in counterpart Japanese Application No. 2004-127924 with English translation.

* cited by examiner

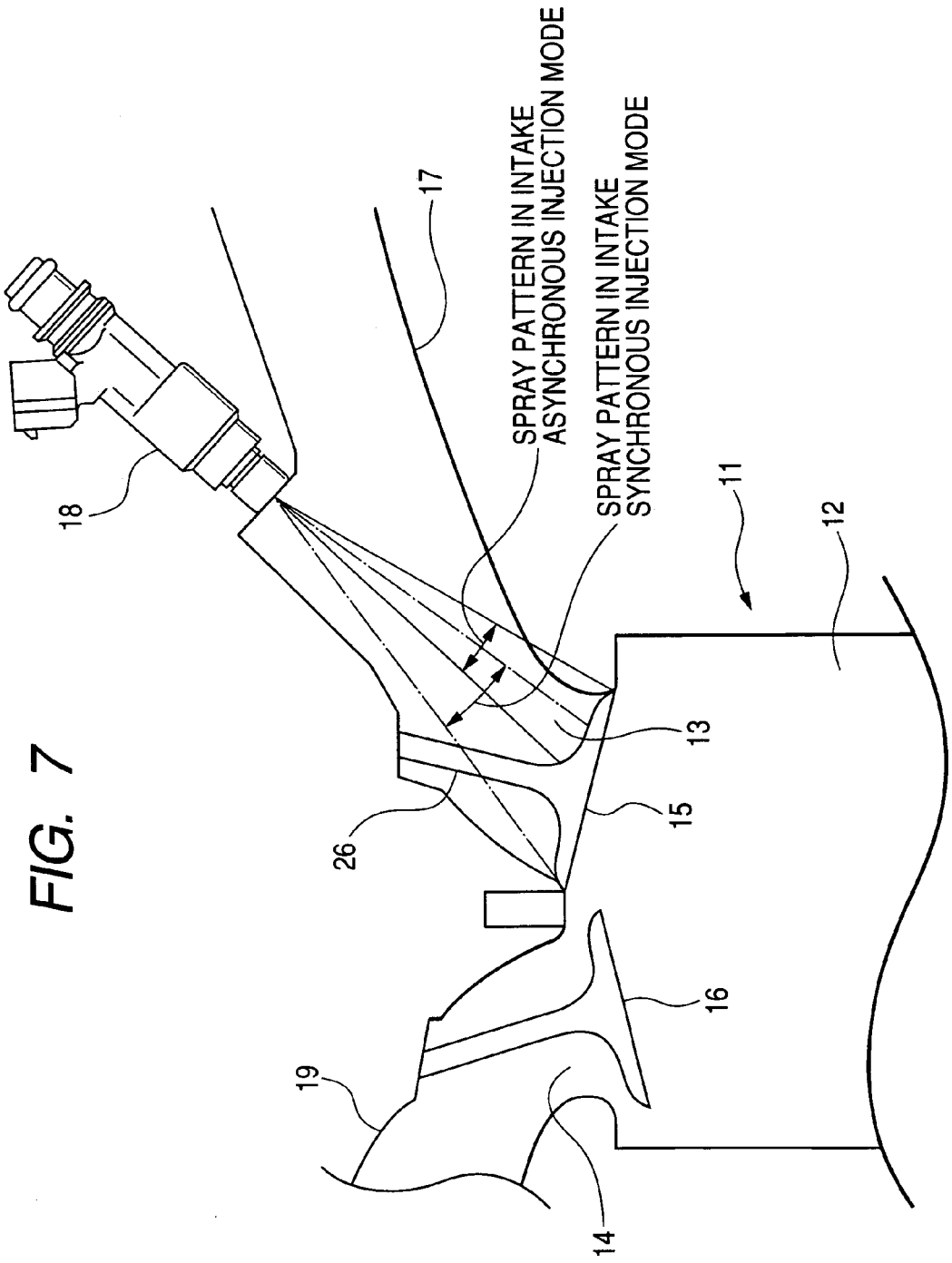

AIM AT LEFT INTAKE VALVE ← → AIM AT RIGHT INTAKE VALVE

FIG. 15(a)
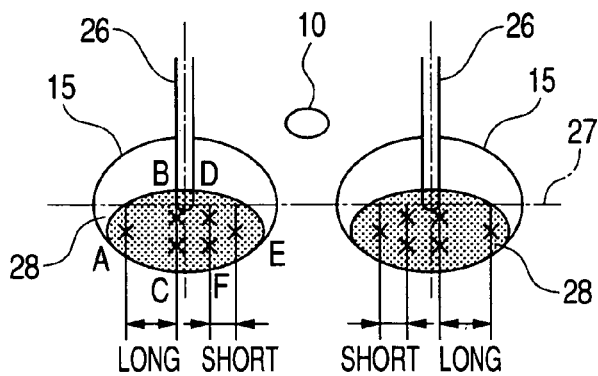
FIG. 15(b)  FIG. 15(c)
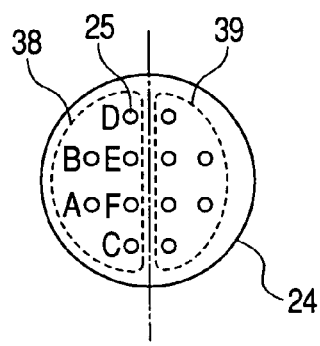 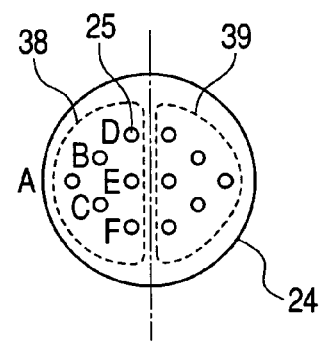
FIG. 16(a)
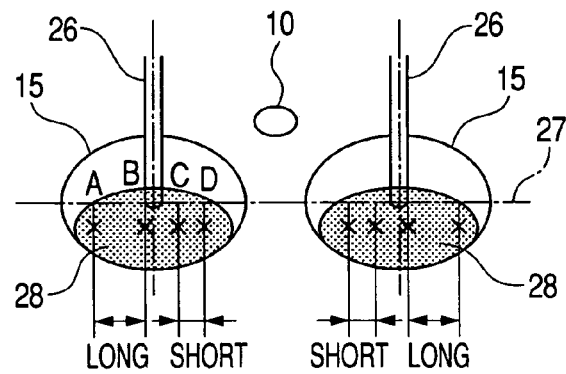
FIG. 16(b)
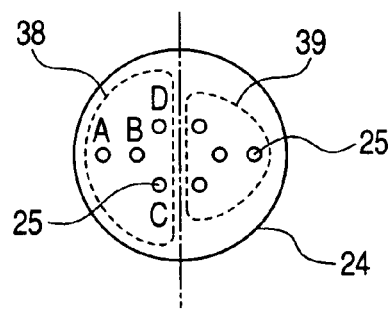

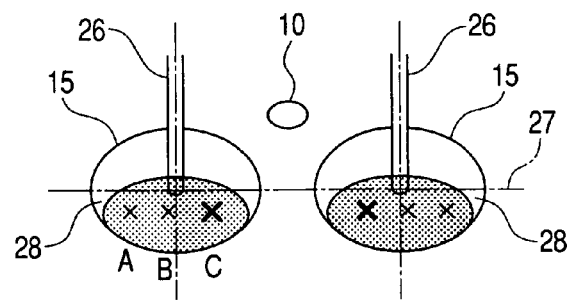
FIG. 19(a)
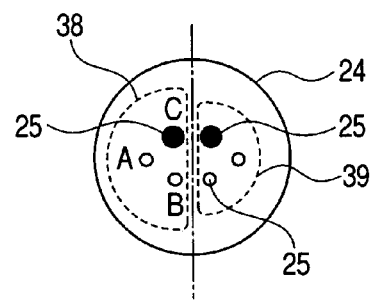
FIG. 19(b)
FIG. 20
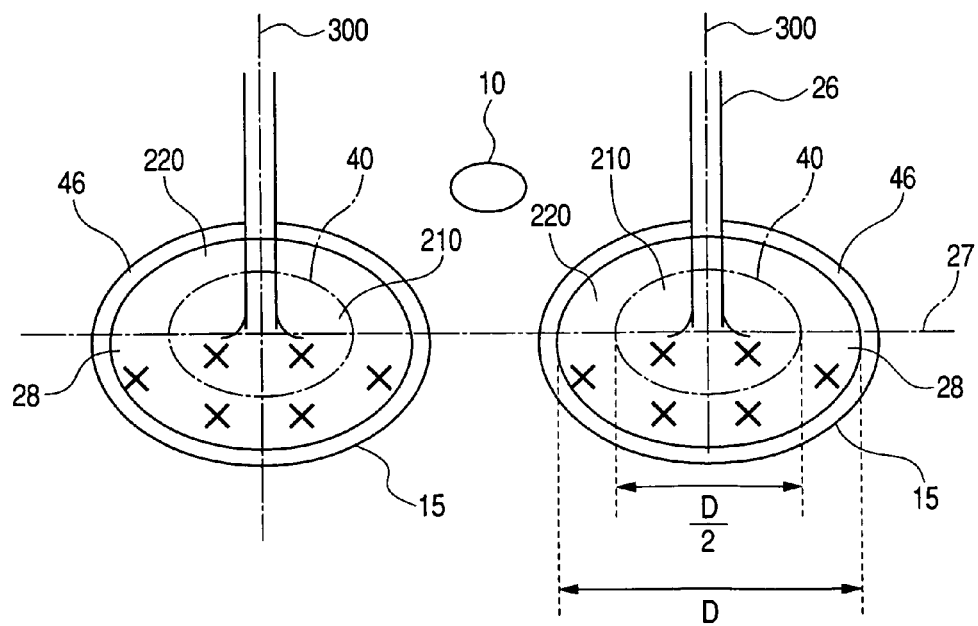

FUEL INJECTOR DESIGNED TO OPTIMIZE PATTERN OF FUEL SPRAY

CROSS REFERENCE TO RELATED DOCUMENT

The present application claims the benefit of Japanese Patent Application No. 2004-127924 filed on Apr. 23, 2004, the disclosure of which is incorporated herein by reference.

BACKGROUND OF THE INVENTION

1. Technical Field of the Invention

The present invention relates generally to a fuel injector designed to inject fuel into an internal combustion engine in an unique spray pattern, and more particularly to an improved structure of such a fuel injector designed to optimize the pattern of a spray of fuel when hitting a head of an intake valve of the engine.

2. Background Art

Japanese Patent Publication Nos. 6-101603 and 4-121435 disclose an injector orientation changing mechanism which is installed in an intake manifold of an internal combustion engine to change the direction in which fuel is sprayed from a fuel injector to an intake port based on operating conditions of the engine in order to optimize the pattern of the sprayed fuel.

Use of such a type of injector orientation changing mechanism results in an increase in production costs of fuel injectors and also requires a complex controller to monitor the operating conditions of the engine to control the movement of the injector orientation changing mechanism. The injector orientation changing mechanism is, therefore, unsuitable for practical use or purposes.

In recent years, there has been proposed a fuel injection system, as discussed in the $8^{th}$ Aachen Colloquium, which works to orient a jet of fuel to a bottom wall surface of an intake port of the engine (i.e., an upstream portion of the head of an intake valve) for the purpose of reducing HC emissions at start and right after start of the engine. The system is designed based on the fact that when a large amount of fuel sticks to around an exhaust port of a combustion chamber of the engine, it will cause most of the fuel to be discharged from the exhaust port without being burned, thus resulting in an increased amount of HC emissions. Specifically, an fuel injection valve is so installed as to produce and direct a spray of fuel to the bottom wall surface of the intake port to wet it with much fuel for minimizing adhesion of fuel to around the exhaust port.

However, experimental researches made by the inventors of this application have showed that when a large amount of fuel is, like the system, as described above, sprayed and adhered to the bottom wall surface of the intake port of the engine to wet it at the start of the engine when the fuel injection valve is required to spray much fuel, it will cause the fuel staying on the bottom wall surface the intake port to be vaporized in an instant and drawn into the combustion chamber, so that an air-fuel mixture in the combustion chamber is enriched undesirably, thus resulting in rich misfire leading to an increased amount of HC emissions from the engine.

The fuel injection timing is usually controlled in two modes: an intake synchronous injection mode in which cylinders of the engine are identified using an output of a cam sensor or a crank sensor, and the fuel is jetted into each cylinder in synchronization with the intake stroke of a piston thereof (i.e., during opening of intake valves) and an intake asynchronous injection mode in which the fuel is jetted into the cylinder during closing of the intake valves regardless of the stroke of the piston. Usually, at the start of the engine, the intake asynchronous injection mode is entered until the cylinders are identified. After such identification, the intake synchronous injection mode is subsequently entered. Specifically, the fuel injection timing is switched between the synchronous injection mode and the intake asynchronous injection mode based on running conditions of the engine.

In the intake asynchronous injection mode, the intake ports of the combustion chamber of the engine are kept closed, so that no air flows exist in the intake ports, thus causing a spray of fuel to go straight to a target spot. In the intake asynchronous injection mode, air flows are produced in the intake ports, thus causing a stream of spray of fuel to be based or shifted undesirably by the air flow in each of the intake ports toward exhaust valve of the engine.

Therefore, when a target area to which the fuel injector aims at spraying fuel is selected toward the center of the head of the intake valve in the intake asynchronous injection mode in order to minimize wetting of the bottom wall surface of the intake port with fuel, it will eliminate the problem of rich misfire, but however, the shifting of the stream of fuel spray arising from the air flow within the intake port in the intake synchronous injection mode results in an increased amount of fuel sticking to around the exhaust port in the combustion chamber. This will lead to an increase in amount of fuel discharged from the exhaust port without being burned, thereby increasing HC emissions from the engine undesirably.

SUMMARY OF THE INVENTION

It is therefore a principal object of the invention to avoid the disadvantages of the prior art.

It is another object of the invention to provide an inexpensive and simple structure of a fuel injector designed to avoid rich misfire and reduce HC emissions from an internal combustion engine regardless of the intake asynchronous and synchronous injection modes.

According to one aspect of the invention, there is provided a fuel injector which may be employed in automotive internal combustion engines. The fuel injector comprises: (a) an injector body having a fuel outlet; and (b) a spray hole formed in the fuel outlet. The spray hole are geometrically designed to produce a spray of fuel in a predetermined pattern so that substantially 70% or more of an amount of the spray hits a preselected area on a surface of a head of an intake valve of an engine when the intake valve is closed. The preselected area is one of a first and a second area on the surface of the head of the intake valve which are defined by a reference boundary line extending through a joint of the head of the intake valve with a stem of the intake valve. The first area is closer to an intake manifold of the engine, while the second area is closer to an exhaust valve of the engine. The preselected area is the first area. This results in an decreased amount of fuel adhered to an inner bottom wall of the intake manifold near an intake port even in an intake asynchronous injection mode wherein much fuel is injected to a combustion chamber when the intake valve is closed at the start of the engine. Therefore, even when the speed of the engine is increased right after the start-up thereof, so that the fuel staying on the inner bottom wall of the intake manifold is vaporized in an instant and enters the combustion chamber, an air-fuel mixture in the combustion chamber is prevented from being over-enriched which will lead to the rich misfire.

In the preferred mode of the invention, a plurality of spray holes are formed in the fuel outlet. The predetermined pattern of the spray of fuel is established by setting at least one of layout of the spray holes at the fuel outlet, an angular direction in which a jet of the fuel is outputted from each of the spray holes, a diameter of each of the spray holes, and a pitch between adjacent two of target spots on the preselected area of the head of the intake valve each of which one of the spray holes aims at directing a central portion of the jet of fuel which is the greatest in flow rate of fuel.

If the surface of the head of the intake valve is broken down into an inner peripheral area and an outer peripheral area demarcated by a reference circle which is defined around a center of the head of the intake valves and has a diameter that is half a diameter of a circular area derived by omitting, from an entire surface area of the head of the intake valve, an outermost annular area that is an area on the head of the intake valve which works as a seat that is to abut an open end of an inner wall of the intake manifold defining the intake port when the intake valve is closed. At least one of the spray holes are designed to aim at producing and directing a jet of fuel to the inner peripheral area, while more than half all the spray holes are provided to aim at directing jets of fuel to the outer peripheral area.

All the spray holes may be geometrically designed to produce and orient jets of fuel to inside ranges between the reference boundary line and a reference line which extends parallel to the reference boundary line and tangent to a perimeter of an area on the surface of the head of the intake valves which is interrupted by an inner wall of the intake port so that the area is invisible from a center of a fuel jetting from the fuel outlet.

The spray holes may be geometrically designed to produce two sprays of fuel, one for each of two inlet ports of a combustion chamber in a cylinder of the engine which are selectively closed by heads of intake valves, respectively.

Each of the head of the intake valves may have the preselected area. The preselected area of a left one of the heads of the intake valves, as viewed from the fuel outlet of the injector body, is delimited by the reference boundary line that is located at an angular interval 10° to 30° away from a reference line in a clockwise direction, as viewed from the fuel outlet. The preselected area of a right one of the heads of the intake valves, as viewed from the fuel outlet of the injector body, is delimited by the reference boundary line that is located at an angular interval 10° to 30° away from a reference line in a counterclockwise direction, as viewed from the fuel outlet.

The spray holes may be broken down into a first group and a second group. Each of the first and second groups is so designed to produce the spray of fuel for one of the intake ports of the combustion chamber of the engine that a portion of the spray has a maximum flow rate within a range defined around a line extending between the joint of the head of the intake valve with the stem of the intake valve and a center of a fuel jetting of a corresponding one of the first and second groups.

The first group of the spray holes ma be designed to produce and orient the spray of fuel to the head of a left one of the intake valves, as viewed from the fuel outlet. The second group of the spray holes may be designed to produce and orient the spray of fuel to the head of a right one of the intake valves. The first group has ones of the spray holes which are provided to aim at a right side of the preselected area, as viewed from the fuel outlet, and greater in number than remaining ones of the spray holes. The second group has ones of the spray holes which is provided to aim at a left side of the preselected area, as viewed from the fuel outlet, and greater in number than remaining ones of the spray holes.

The first group of the spray holes may alternatively be designed to produce and orient the spray of fuel to the head of a left one of the intake valves, as viewed from the fuel outlet. The second group of the spray holes may also be designed to produce and orient the spray of fuel to the head of a right one of the intake valves. The first group has ones of the spray holes which are provided to aim at producing and directing jets of the fuel to target spots defined on a right side of the preselected area, as viewed from the fuel outlet, at a spot-to-spot pitch shorter than that in remaining one of the spray holes. The second group has ones of the spray holes which are provided to aim at producing and directing jets of the fuel to target spots defined on a left side of the preselected area, as viewed from the fuel outlet, at a spot-to-spot pitch shorter than that in remaining one of the spray holes.

The first group of the spray holes may alternatively be designed to produce and orient the spray of fuel to the head of a left one of the intake valves, as viewed from the fuel outlet. The second group of the spray holes may also be designed to produce and orient the spray of fuel to the head of a right one of the intake valves. The first group has ones of the spray holes which are provided to aim at producing and directing jets of the fuel to a right side of the preselected area, as viewed from the fuel outlet, and greater in diameter than remaining one of the spray holes. The second group has ones of the spray holes which are provided to aim at producing and directing jets of the fuel to a left side of the preselected area, as viewed from the fuel outlet, and greater in diameter than remaining one of the spray holes.

The spray may alternatively be broken down into a plurality of spray hole groups which work to produce a plurality of sprays of fuel, one for each of a plurality of inlet ports of a combustion chamber in a cylinder of the engine. The sprays of fuel are different in flow rate from each other.

One of the spray hole groups, which is so selected as to produce one of the sprays of fuel greater in the flow rate, may be at least one of the spray holes which is greater in diameter than that in one of the other spray holes groups which is so selected as to produce the spray of fuel smaller in the flow rate.

One of the spray hole groups, which is so selected as to produce one of the sprays of fuel greater in the flow rate, may alternatively have ones of the spray holes which are greater in number than that in one of the other spray holes groups which is so selected as to produce the spray of fuel smaller in the flow rate.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 7 is a partially sectional view which shows patterns of fuel sprays produced by a fuel injector of the first embodiment of the invention when an engine is in an intake asynchronous injection mode and an intake synchronous injection mode;

FIG. 15(a) is a schematic perspective view which shows target spots to which spray holes of a fuel injector according to the sixth embodiment of the invention aim at directing jets of fuel;

FIG. 15(b) is a plan view which shows layout of spray holes of a fuel injector of the sixth embodiment of the invention aiming at the target spots, as illustrated in FIG. 15(a);

FIG. 15(c) is a plan view which shows a modified layout of spray holes of a fuel injector of the sixth embodiment of the invention aiming at target spots, as illustrated in FIG. 15(a);

FIG. 16(a) is a schematic perspective view which shows target spots to which spray holes of a fuel injector in a modified form of the sixth embodiment of the invention aim at directing jets of fuel;

FIG. 16(b) is a plan view which shows layout of spray holes of a fuel injector aiming at the target spots, as illustrated in FIG. 16(a);

FIG. 19(a) is a schematic perspective view which shows target spots to which spray holes of a fuel injector in a second modified form of the seventh embodiment of the invention aim at directing jets of fuel;

FIG. 19(b) is a plan view which shows layout of spray holes of a fuel injector aiming at the target spots, as illustrated in FIG. 19(a);

FIG. 20 is a schematic perspective view which shows how to define areas of heads of intake valves to which spray holes of a fuel injector according to the eighth embodiment of the invention aim at directing jets of fuel;

FIG. 25(*b*) is a plan view which shows layout of spray holes of a fuel injector aiming at the target spots, as illustrated in FIG. 25(*a*);

FIG. 26(*b*) is a plan view which shows layout of spray holes of a fuel injector aiming at the target spots, as illustrated in FIG. 26(*a*);

FIG. 27(*b*) is a plan view which shows layout of spray holes of a fuel injector aiming at the target spots, as illustrated in FIG. 27(*a*);

FIG. 28(*b*) is a plan view which shows layout of spray holes of a fuel injector aiming at the target spots, as illustrated in FIG. 28(*a*);

FIG. 29(*b*) is a plan view which shows layout of spray holes of a fuel injector aiming at the target spots, as illustrated in FIG. 29(*a*);

FIG. 30(*b*) is a plan view which shows layout of spray holes of a fuel injector aiming at the target spots, as illustrated in FIG. 30(*a*);

FIG. 31(*b*) is a plan view which shows layout of spray holes of a fuel injector aiming at the target spots, as illustrated in FIG. 31(*a*).

DESCRIPTION OF THE PREFERRED EMBODIMENTS

Figure 1:
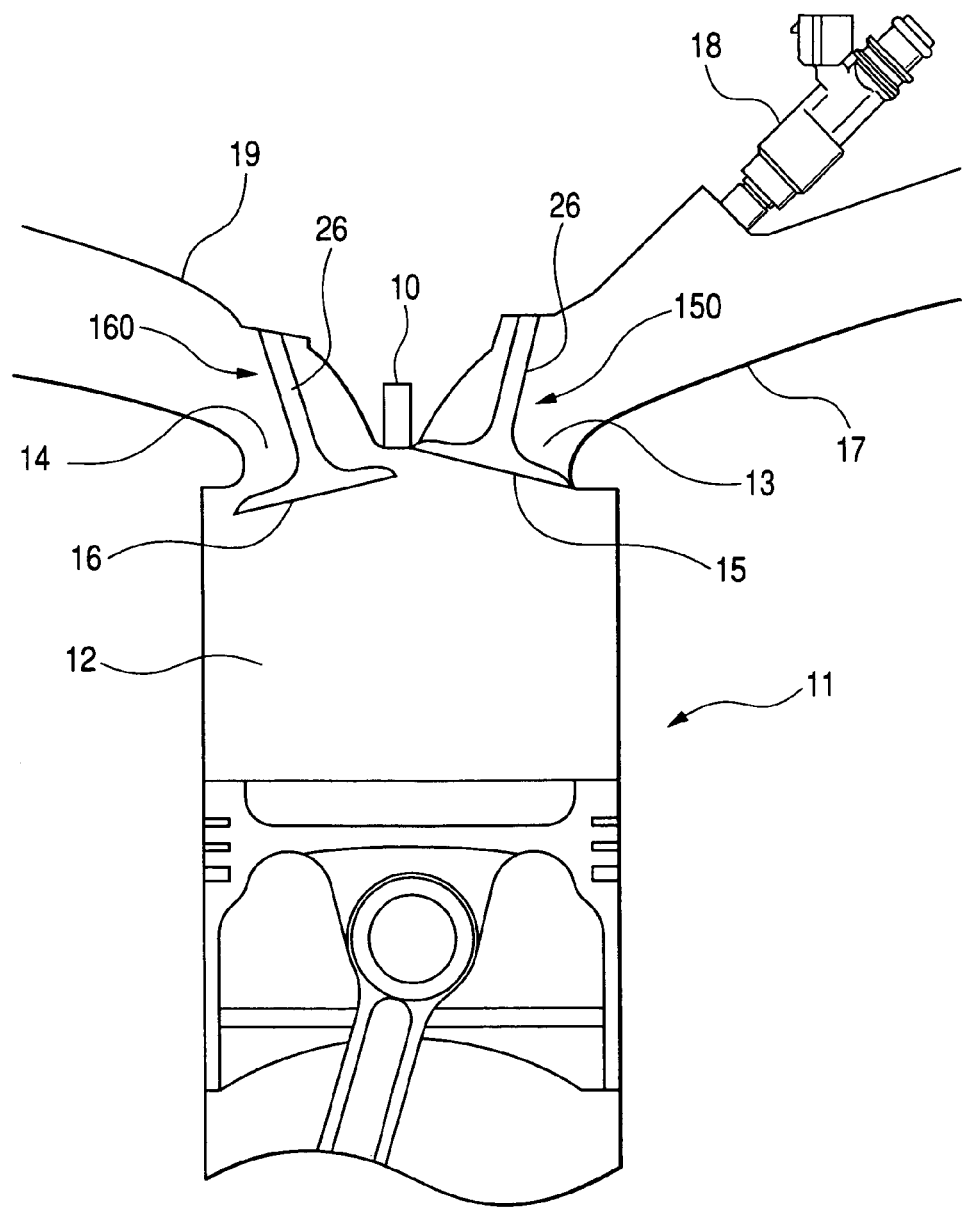
FIG. 1 is a side view which shows a fuel injector of tee invention which is installed in an internal combustion engine.
Figure 2:
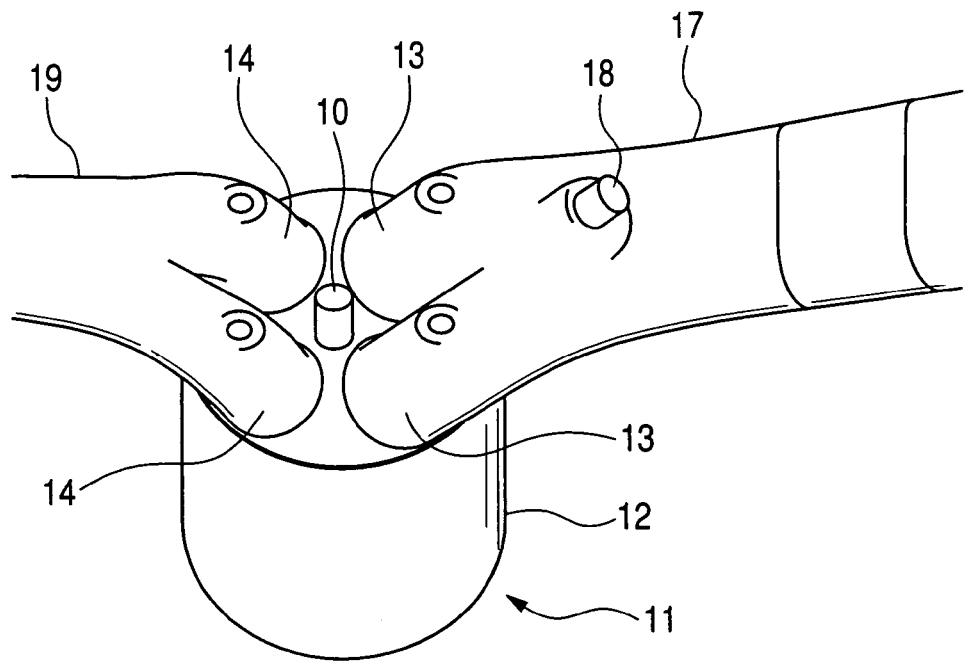
FIG. 2 is a perspective view which shows a fuel injector of the invention which is installed in an intake valve of an engine.

Referring to the drawings, wherein like reference numbers refer to like parts in several views, particularly to FIGS. 1 to 8, there is shown a fuel injector according to the first embodiment of the invention which is implemented in this and other embodiments, as will be discussed later, by, for example, a fuel injection valve working to inject fuel to an internal combustion engine 11.

Figure 3:
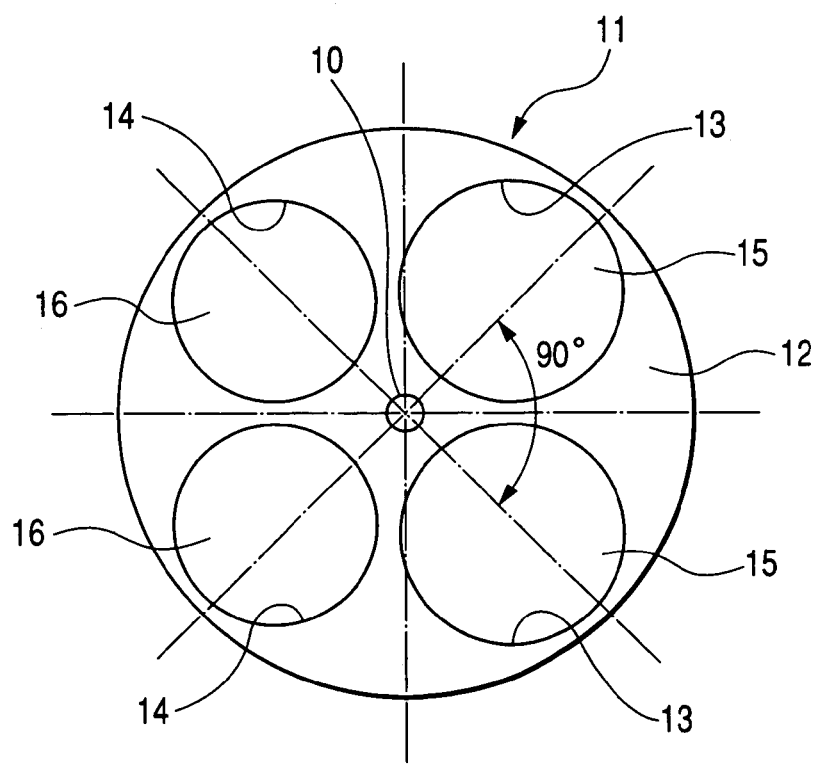
FIG. 3 is a transverse sectional view which shows intake and exhaust ports of a cylinder of an engine.

The engine 11 has, for example, two intake ports 13 and two exhaust ports 14 which are arrayed at intervals of 90°, as clearly shown in FIG. 3, around a spark plug 10 installed in the center of an upper wall of a combustion chamber 12.

The intake ports 13 are opened or closed by heads 15 of intake valves 150. Similarly, the exhaust ports 14 are opened or closed by heads 16 of exhaust valves 160. To the intake ports 13, branches of an intake manifold 17 are connected. The fuel injection valve 18 is installed upstream of a branch connection of the intake manifold 17. To the exhaust ports 14, branches of an exhaust manifold 19 are connected.

Figure 4:
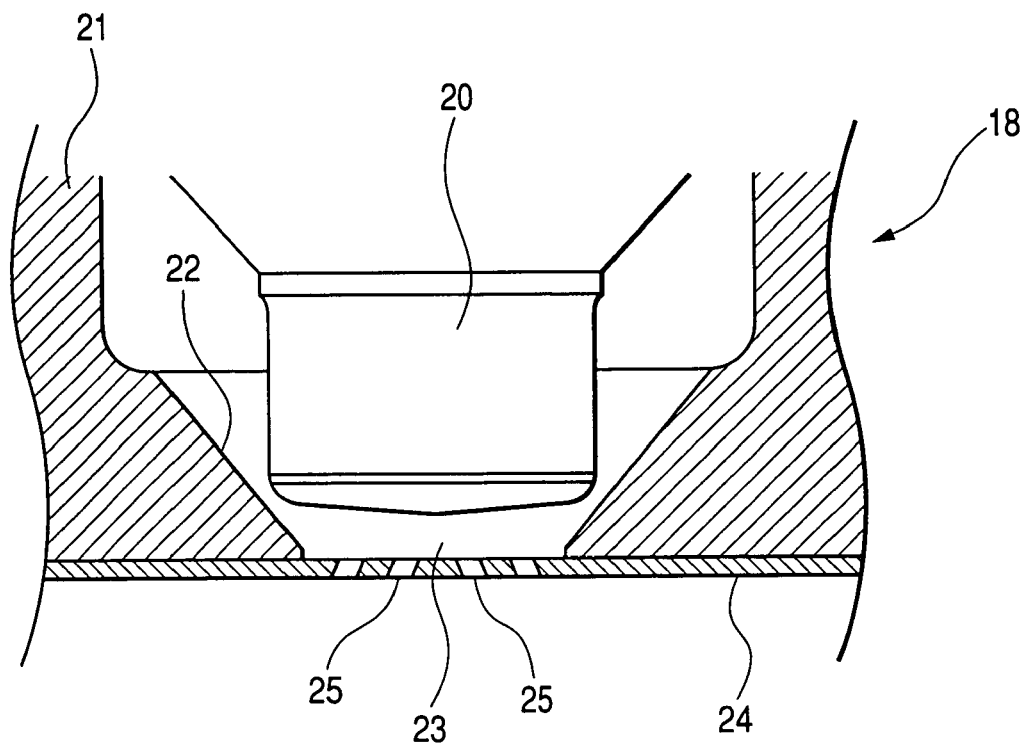
FIG. 4 is a partially sectional view which shows a tip portion of a fuel injector of the invention.

The fuel injection valve 18 has, as clearly shown in FIG. 4, a nozzle head defined by a lower portion of a valve body 21 in which a tapered valve seat 22 is formed on which a needle valve 20 is seated. The valve seat 22 leads to a nozzle opening (i.e., a fuel outlet) 23 which is to be opened or closed by an upward or downward movement of the needle valve 20 controlled by a solenoid (not shown). A spray plate 24 is affixed to the lower end of the valve body 21 to cover the nozzle opening 23. The spray plate 24 has a plurality of (e.g., twelve) spray holes 25 (also called nozzle holes) formed therein.

Fuel spray patterns of the fuel injection valve 18 will be described below with reference to FIGS. 1 and 5(*a*) to 7.

If an upper surface, as viewed in FIG. 1, of the head 15 of each of the intake valves 150 is broken down into two parts: a horizontal semilunar area 28 located far from the exhaust manifold 19 (i.e., close to the bottom wall of the intake manifold 17, in other words, an inner peripheral wall of the combustion chamber 12) and a horizontal semilunar area 29 located close to the exhaust manifold 19 (i.e., far from the bottom wall of the intake manifold 17, in other words, close to a longitudinal center line of the combustion chamber 12) which are demarcated by a reference boundary line 27 extending perpendicular to lengths of stems 26 of the intake valves 150 (i.e., a longitudinal center line of the fuel injection valve 18) through the centers of joints between the stems 26 and the heads 15 of the intake valves 150, the spray holes 25 are goemetrically designed to produce sprays of fuel, one for each of the intake ports 13, so that approximately 70% or more of the amount of each of the sprays of fuel outputted per fuel injection cycle hits a corresponding one of the areas 28 of the heads 15 of the intake valves 150 when the fuel injection valve 18 is in an intake asynchronous injection mode wherein the fuel injection valve 18 is required to be opened when the intake valve 150 is placed in a closed state. This may be achieved by, as will be described later in detail, setting at least one of the layout of the spray holes 25 in the spray plate 24, the angular direction in which the fuel is jetted from each of the spray holes 25 (i.e., an angle which a longitudinal center line of each of the spray holes 25 makes with the longitudinal center line of the fuel injection valve 18), the diameter of each of the spray holes 25, and the pitch between adjacent two of target spots on the valve heads 15 to each of which one of the spray holes 25 aims at directing a central portion of the jet of fuel which is the greatest in flow rate or amount of fuel.

Figure 5A:
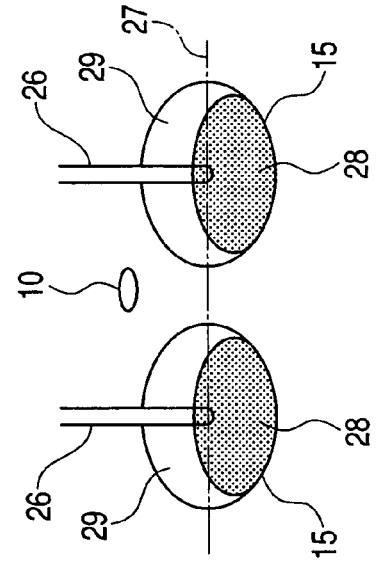
FIG. 5(a) is a schematic perspective view which shows how to define areas of heads of intake valves to which most of fuel sprays are to be directed by a fuel injector according to the first embodiment of the invention.
Figure 5B:
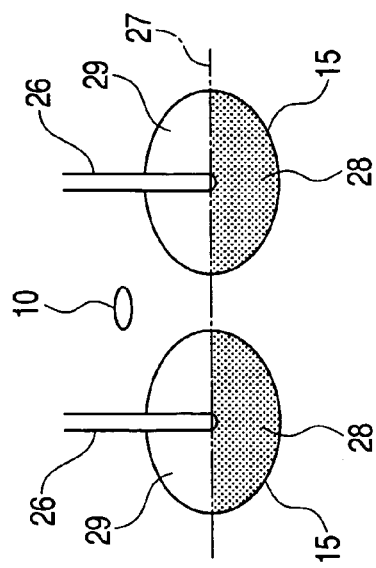
FIG. 5(b) is a schematic perspective view which shows patterns of sprays of fuel on heads of intake valves, as produced by a fuel injector according to the first embodiment of the invention.

In a case where the fuel injection valve 13 is to be installed at a location where the areas 28 and 29 of the intake valves 15, as illustrated in FIG. 5(*a*), are all perceived visually from the centers of fuel jettings from the fuel injection valve 18 without being interrupted by inner walls of the intake ports 13 (i.e., the inner walls of the intake manifold 17), the fuel injection valve 18 is so designed as to produce, in the intake asynchronous injection mode, an oval spray pattern, as viewed in units of the heads 15 of the intake valves 150 in FIG. 5(*b*), so that approximately 70% or more of the amount of spray of fuel outputted per fuel injection cycle hits the area 28 of each of the intake valves 150. Many of engines of the type in which the fuel injection valve 18 is to be installed in a cylinder head are so designed that the areas 28 and 29 are all viewed from the centers of fuel jettings from the fuel injection valve 18. Note that the center of a fuel jetting from the fuel injection valve 18, as referred to in this or subsequent embodiments, represents an intersection between the surface of the spray plate 24 and a longitudinal center line of a stream of spray of fuel outputted from the nozzle opening 23. The longitudinal center line usually coincides with a portion of the stream of spray which is the greatest in flow rate of fuel. For example, in a case where two of the spray holes 25 are designed to produce a single spray of fuel, the center of fuel jetting is the middle between those two spray holes 25. In a case where three of the spray holes 25 are designed to produce a single spray of fuel, the center of fuel jetting is a middle one of those three spray holes 25.

Figure 6A:
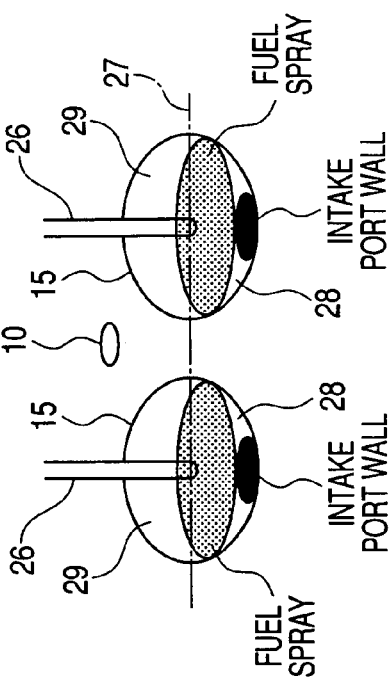
FIG. 6(a) is a schematic perspective view which shows a case where portions of heads of intake valves are visually interrupted by inner walls of intake ports.
Figure 6B:
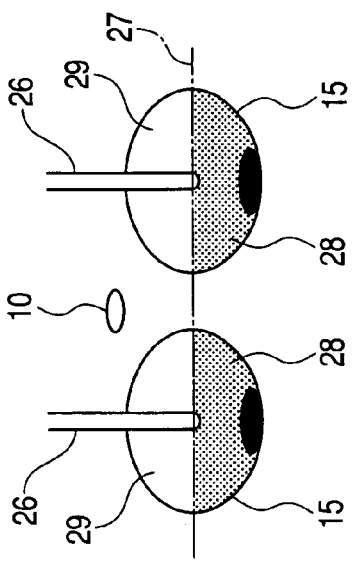
FIG. 6(b) is a schematic perspective view which shows patterns of sprays of fuel on heads of intake valves, as produced by a modification of a fuel injector of the first embodiment of the invention.
Figure 8A:
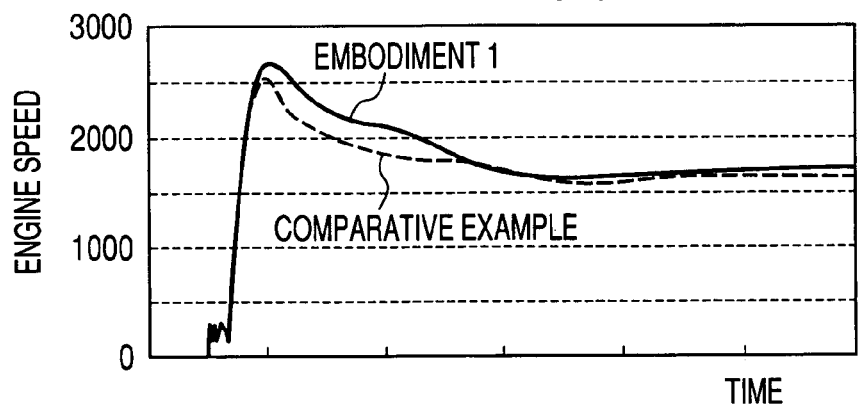
FIGS. 8(a), 8(b), and 8(c) are graphs which represent variations in engine speed, air-fuel ratio of exhaust gas, and HC emissions with time in the first embodiment and a comparative example, respectively.
Figure 8B:
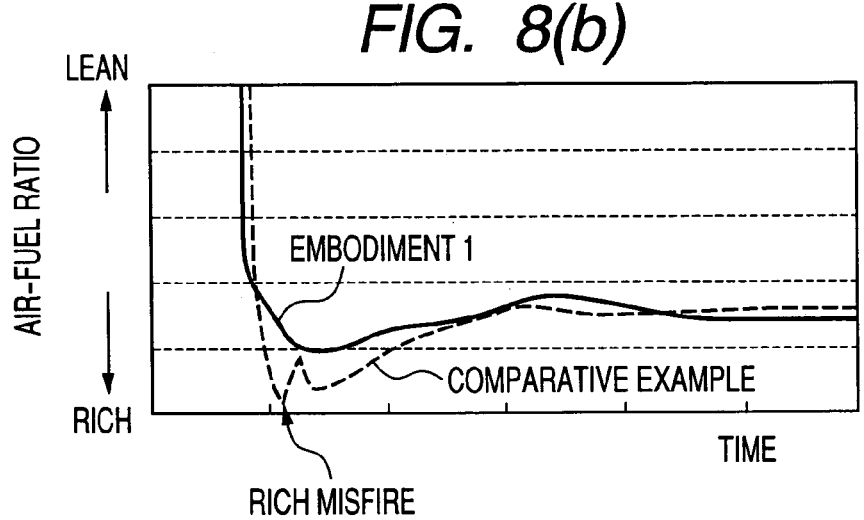
Figure 8C:
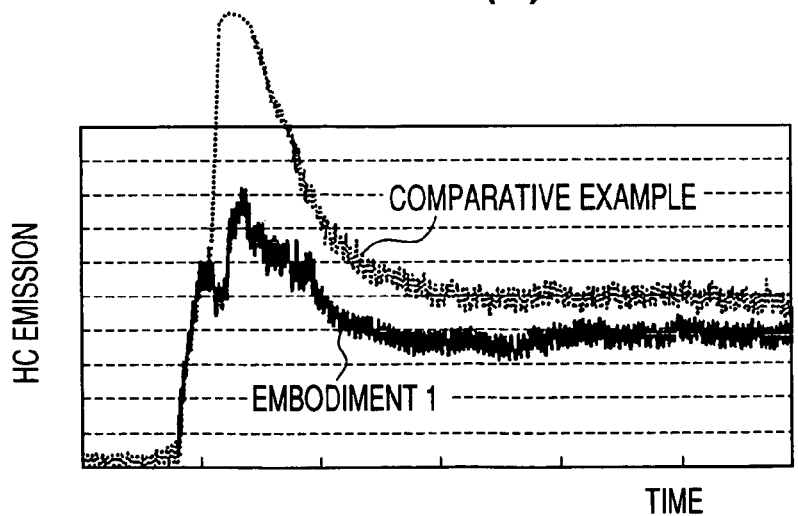

In a case where the fuel injection valve 18 is to be installed at a location where portions of the areas 28 of the heads 15 of the intake valves 150, as painted black in FIG. 6(a), are interrupted by the inner walls of the intake ports 13, respectively, so that they are invisible from the centers of fuel jettings from the fuel injection valve 18, the fuel injection valve 18 is so designed as to produce, in the intake asynchronous injection mode, an oval spray pattern, as viewed in units of the valve heads 15 in FIG. 6(b), so that approximately 70% or more of the amount of spray of fuel outputted per fuel injection cycle hits the area 28 of each of the valve heads 15 except the portion interrupted visually by the inner wall of the intake port 13. Many of engines of the type in which the fuel injection valve 18 is to be installed directly in the intake manifold 17 so designed that portions of the areas 28 are invisible from the centers of fuel jettings from the fuel injection valve 18.

The fuel injection timing is usually controlled in two modes: an intake synchronous injection mode in which cylinders of the engine are identified using an output of a cam sensor or a crank sensor, and the fuel is jetted into each cylinder in synchronization with the intake stroke of the piston thereof (i.e., during opening of the intake valves 150) and an intake asynchronous injection mode in which the fuel is jetted into the cylinder during closing of the intake valves 150 regardless of the stroke of the piston. Usually, at the start of the engine, the intake asynchronous injection mode is entered until the cylinders are identified. After such identification, the intake synchronous injection mode is subsequently entered. Specifically, the fuel injection timing is switched between the synchronous injection mode and the intake asynchronous injection mode based on running conditions of the engine.

Specifically, as illustrated in FIG. 7, when the intake valves 150 are closed, so that no air flows exist in the intake ports 13, the intake asynchronous injection mode is entered to activate or open the fuel injection valve 18 to spray the fuel into the combustion chamber 12. A stream of the sprayed fuel then goes straight to a target area on the head 15 of each of the intake valves 150. Upon entrance of the intake synchronous injection mode to spray the fuel into the combustion chamber 12 when the intake valves 15 are opened, air flows are produced in the intake ports 13, thereby causing a stream of the sprayed fuel to be biased or shifted undesirably by the air flow in each of the intake ports 13 toward the center of the combustion chamber 12 (i.e. close to the exhaust valve 16).

In order to alleviate the above problem, the spray holes 25 of the fuel injection valve 18 are, as described above, so geometrically designed that approximately 70% or more of the amount of fuel per fuel injection cycle hits on the areas 28 of the intake valves 15 in the intake asynchronous injection mode. This results in an decreased amount of fuel adhered to the inner bottom wall of the intake manifold 17 near the intake ports 13 even in the intake asynchronous injection mode wherein much fuel is injected to the combustion chamber 12 when the intake valves 150 are closed at the start of the engine 11. Therefore, even when the speed of the engine 11 is increased right after the start-up thereof, so that the fuel staying on the inner bottom wall of the intake manifold 17 is vaporized in an instant and enters the combustion chamber 12, an air-fuel mixture in the combustion chamber 12 is prevented from being over-enriched which will lead to the rich misfire.

In the intake synchronous injection mode wherein the intake valves 150 are opened, but the fuel is sprayed into the combustion chamber 12, air flows in the intake ports 13, as described above, cause streams of the fuel to be biased toward the exhaust valves 160. The fuel injection valve 18 of this embodiment, however, works to allow the center of the spray of fuel to be shifted only to near the center of the intake ports 13, thereby avoiding adhesion of much fuel to the inner wall of the combustion chamber 12 near the exhaust ports 14 during the intake synchronous injection mode, which suppresses an increase in HC emissions. The structure of the fuel injection valve 18 eliminates the need for an injector orientation changing mechanism, as discussed in the introductory part of this application, for changing the orientation of the fuel injection valve 18 and may be employed in various types of intake port infection engine.

We performed two tests one of which oriented a spray of fuel to the head 15 of the exhaust valve 150 so that approximately 70% or more of the amount of the fuel spray hit the area 28 of the intake valve 150 in the intake asynchronous injection mode, and the other of which is a comparative test and produced a spray of fuel so that less than 70% of the amount of the fuel spray hit the area 28 of the intake valve 150 in the intake asynchronous injection mode. We started the engine in the intake asynchronous injection mode and measured variations in speed of the engine, air-fuel ratio of exhaust gas, and HC emissions from the engine. Results of the tests are shown in graphs of FIGS. 8(a), 8(b), and 8(c). The graphs that, in the comparative test in which the fuel is sprayed so that less than 70% of the amount of the fuel spray hit the area 28 of the intake valve 150, when the velocity of air flowing through the intake port 13 is elevated up to a certain level by a rapid increase in engine speed immediately after start-up of the engine, much fuel staying on the inner bottom wall of the intake port 13 is vaporized in an instant and drawn into the combustion chamber 12, so that the air-fuel mixture in the combustion chamber 12 is enriched, thus resulting in the rich misfire and increase in HC emissions, while, in the test where the fuel is sprayed so that 70% or more of the amount of the fuel spray hit the area 28 of the intake valve 150, less fuel is adhered to the bottom wall surface of the intake port 13 even in the intake asynchronous injection mode, thus preventing the air-fuel mixture in the combustion chamber 12 from being enriched which results in the rich misfire.

The fuel injection valve 18 according to the second embodiment of the invention will be described below with reference to FIGS. 9 to 10(b).

Figure 9:
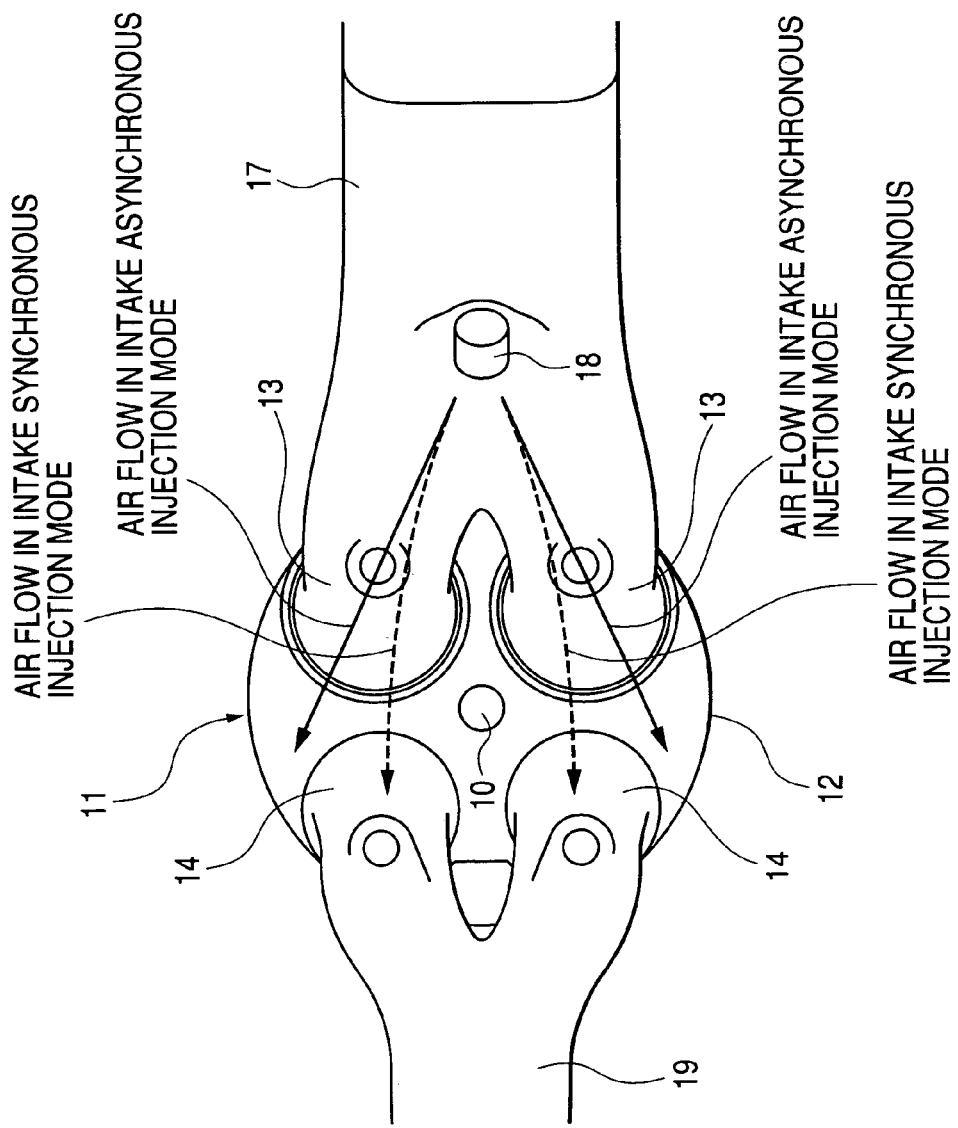
FIG. 9 is a top view which shows air flows drawn into a combustion chamber of an engine in an intake asynchronous injection mode and an intake synchronous injection mode.
Figure 10A:
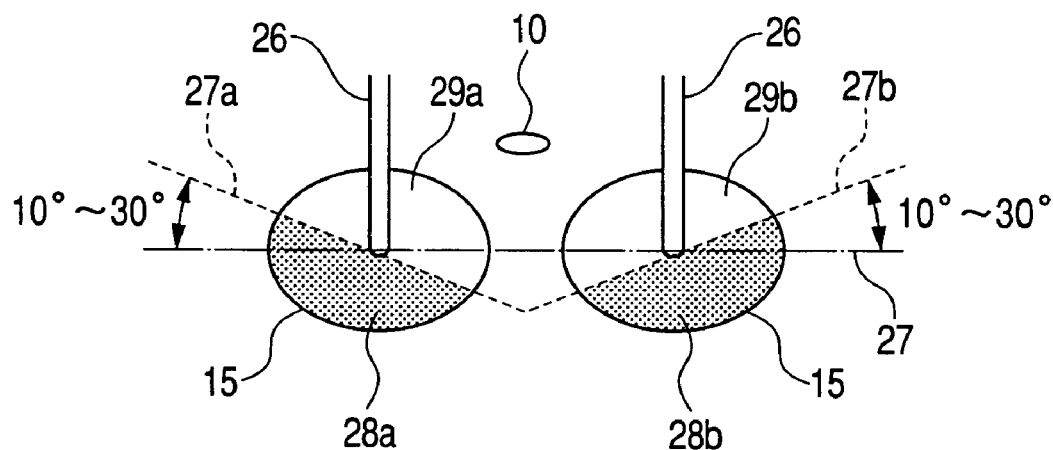
FIG. 10(a) is a schematic perspective view which shows how to define areas of heads of intake valves to which most of fuel sprays are to be directed by a fuel injector according to the second embodiment of the invention.

In the intake synchronous injection mode, streams of air flowing through the two intake ports 13 opening into the combustion chamber 12 are, as can be seen in FIG. 9, usually susceptible to divergence to the longitudinal center line of the combustion chamber 12 (i. e., the spark plug 10). This causes sprays of fuel from the fuel injection valve 18 to be oriented toward the longitudinal center line of the combustion chamber 12 from target areas of the heads 15 of the intake valves 150, so that much fuel sticks to the inner wall of the combustion chamber 12 near the exhaust ports 14 and then discharged without being burned, thus resulting in an increased amount of HC emissions.

Figure 10B:
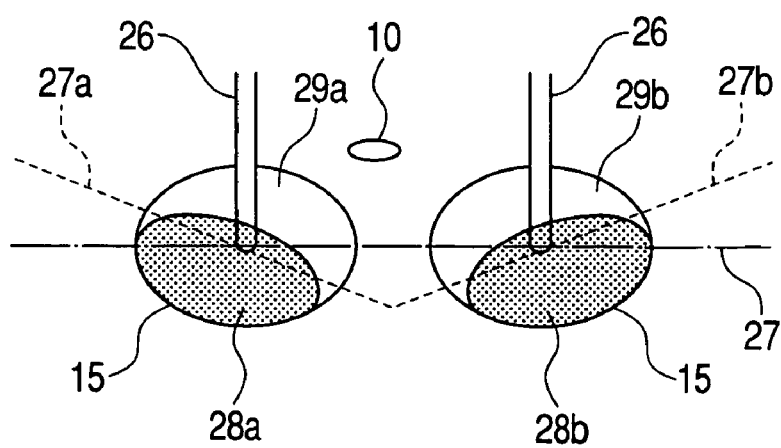
FIG. 10(b) is a schematic perspective view which shows patterns of sprays of fuel on heads of intake valves, as produced by a fuel injector according to the second embodiment of the invention.

In order to alleviate the above problem, the fuel injection valve 18 of this embodiment is designed to orient jets of fuel, as clearly shown in FIG. 10(b), to dark areas of the heads 15 of the intake valves 150. Specifically, an upper surface of the head 15 of a left one of the intake valves 150, as viewed in FIG. 10(a), facing the intake port 13 is broken down into two parts: an area 28a and an area 29a which are demarcated by a reference boundary line 27a extending perpendicular to the length of the stem 26 through a joint between the stem 26 and the head 15 of the intake valve 150. The reference boundary line 27a is a line shifted 10° to 30' from the reference boundary line 27, as described in the first embodiment, in a clockwise direction, as viewed from the fuel injection valve 18. The area 29a lies close to the exhaust manifold 19 (i.e., the exhaust ports 14), while the area 28a lies far from the exhaust manifold 19, Similarly, an upper surface of the head 15 of a right one of the intake valves 150 facing the intake port 13 is broken down into two parts: an area 23b and an area 29b which are demarcated by a reference boundary line 27b extending perpendicular to the length of the stem 26 through a joint between the stem 26 and the head 15 of the intake valve 150. The reference boundary line 27a is a line shifted 10° to 30° from the reference boundary line 27 in a counterclockwise direction, as viewed from the fuel injection valve 18. The area 29b lies close to the exhaust manifold 19, while the area 28b lies far from the exhaust manifold 19. The spray holes 25 of the fuel injection valve 18 of this embodiment are geometrically designed to produce two sprays of fuel so that approximately 70% or more of a total amount of the sprays of fuel, as illustrated in FIG. 10(b), hits the areas 28a and 28b of the valve heads 15 when the fuel injection valve 18 is in the intake asynchronous injection mode. This serves to minimize shifting of streams of sprays of fuel from the fuel injection valve 18 to the longitudinal center line of the combustion chamber 12 caused by air flows in the intake ports 13 produced in the intake synchronous injection mode to decrease the amount of fuel sticking to the inner wail of the combustion chamber 12 around the exhaust ports 14. This avoids an undesirable increase in amount of HC emissions when the fuel injection valve 18 is in the intake synchronous injection mode.

The fuel injection valve 18 according to the third embodiment will be described below which is equipped with an air assist feature which assists in enhancing atomization of fuel using an air jet or a heating feature which does it using thermal energy produced by a heater. The air assist feature or the heating feature can be of any known type designed to start and stop production of the air jet selectively or turn on and off a heater selectively. For example, Japanese Patent First Publication No. 4-159452 discloses an example of the air assist feature. Japanese Patent First Publication No. 2003-314402 teaches an example of the heating feature. Either of these may be employed in this embodiment.

A spray pattern of the fuel injection valve 18 greatly depends upon activities of the air assist feature or the heating feature. Use of the air assist feature or the heating feature serves to facilitate the atomization of fuel sprayed from the fuel injection valve 18, thereby improving burning of the fuel in the combustion chamber 12 to reduce HC emissions. Other arrangements of the fuel injection valve 18 are identical with those in the first embodiment. Specifically, the spray holes 25 of the fuel injection valve 18 are designed to produce sprays of fuel so that approximately 70% or more of the amount of the fuel hits on the areas 28 of the intake valves 15 when the fuel injection valve 18 is in the intake asynchronous injection mode. Of course, the air assist feature or the heating feature nay be employed in the fuel injection valve 18 of the second embodiment.

Figure 11:
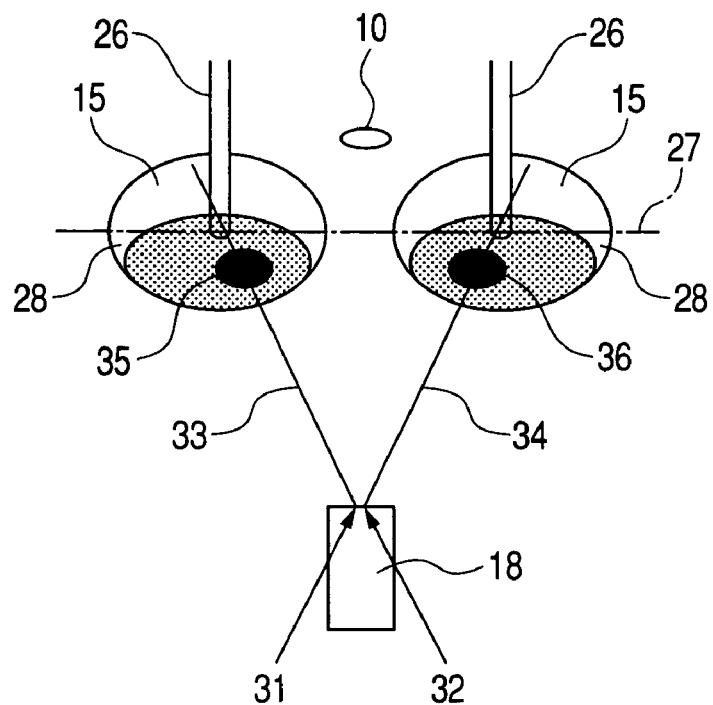
FIG. 11 is a schematic perspective view which shows patterns of sprays of fuel on heads of intake valves, as produced by a fuel injector according to the fourth embodiment of the invention.

The fuel injection valve 18 according to the fourth embodiment of the invention will be described below with reference to FIGS. 11 and 12 which is designed to produce sprays of fuel, one for each of the intake ports 13, so that approximately 70% or more of the amount of each of the sprays of fuel outputted per fuel injection cycle hits a corresponding one of the areas 28 of the heads 15 of the intake valves 150 when the fuel injection valve 18 is in an intake asynchronous injection mode and to minimize the amount of fuel which hits against the surfaces of the heads 15 of the intake valves 150 and then enters the depth of the combustion chamber 12.

Figure 12:
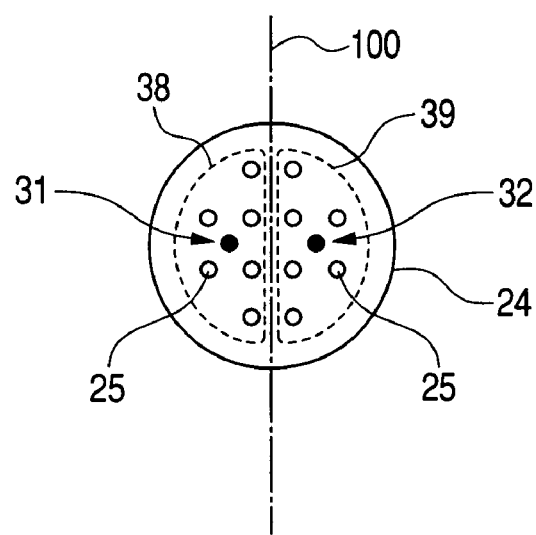
FIG. 12 is a plan view which shows layout of spray holes of a fuel injector of the fourth embodiment of the invention.

The spray plate 24 of the fuel injection valve 18 of this embodiment has the twelve spray holes 25 which are arrayed, as clearly shown in FIG. 12, in the form of # and broken down into a left group 38 and a right group 39, as viewed when facing the heads 15 of the intake valves 150. The left group 38 is made up of six of the spray holes 25 arrayed on the left side of a center line 100 defined on a plane extending through the center of the spray plate 24 (or the longitudinal center line of the fuel injection valve 18) and the center between the stems 26 of the intake valves 15 (i.e., the longitudinal center line of the combustion chamber 12). The left group 38 has the center 31 which makes a center line of a stream of spray of fuel (i.e., the center of fuel jetting). Similarly, the right group 39 is made up of six of the spray holes 25 arrayed on the right side of the center line 100 and has the center 32 which makes a center line of a stream of spray of fuel (i.e., the center of fuel jetting). Lines 33 and 34, as illustrated in FIG. 11, extend from the centers 31 and 32 of the left and right groups 38 and 39 to the centers of the joints of the stems 26 (also referred to as base ends of the stems 26 blow) and the heads 15 of the intake valves 150, respectively. The spray holes 25 of the fuel injection valve 18 are designed to produce two sprays of fuel, one for each of the intake pores 13, so that each of the sprays hits on the area 28 of the head 15 of the intake valve 150 and has a maximum flow rate in a corresponding one of predetermined narrower ranges 35 and 36, as painted black in FIG. 11, defined around the lines 33 and 34, respectively. The ranges 35 and 36 spatially overlap the stems 26 of the intake valves 150 in directions of the lines 33 and 34, respectively. This causes most of fuel sprayed to each of the heads 15 of the intake valves 150 to hit on the stem 26 without directly entering the combustion chamber 12 either in the intake synchronous injection mode or in the intake asynchronous injection mode. This also facilitates the atomization of fuel sprayed from the fuel injection valve 18 to improve burning thereof in the combustion chamber 12, thus resulting in a decrease in HC emissions.

The fuel injection valve 18 of this embodiment may be designed to jet the fuel onto the areas 28a and 28b of the intake valves 15, as defined in the second embodiment, and also have the air assist feature or the heating feature, as discussed in the third embodiment.

Figure 13A:
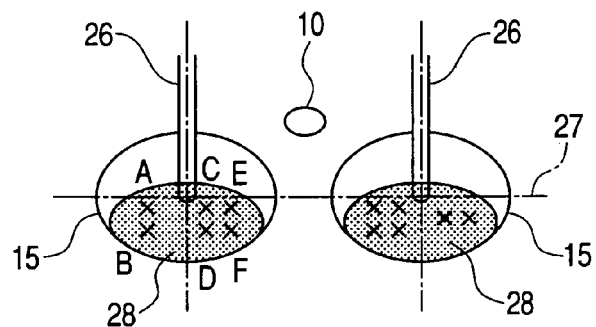
FIG. 13(a) is a schematic perspective view which shows target spots to which spray holes of a fuel injector according to the fifth embodiment of the invention aim at directing jets of fuel.
Figure 13B:
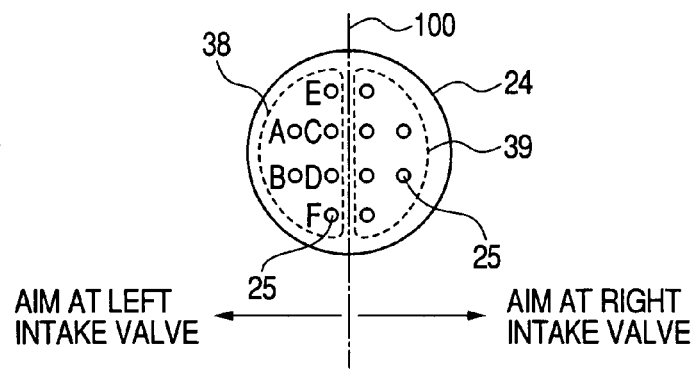
FIG. 13(b) is a plan view which shows layout of spray holes of a fuel injector of the fifth embodiment of the invention.

The fuel injection valve 18 according to the fifth embodiment of the invention will be described below with reference to FIGS. 13(a) and 13(b) which is similar to the first embodiment except as referred to below.

The spray holes 25 in the spray plate 24 are, like the fourth embodiment, broken down into the left group 38 and the right group 39. In the left group 38, ones of the spray holes 25 arrayed closer to the center line 100 are greater in number than the others. In other words, the spray holes 25 are concentrated in number on a side closer to the center line 100 to concentrate a spray of fuel on a right side, as viewed from the fuel injection valve 18, of the area 28 of a left one of the intake valves 150. Similarly, in the right group 39, ones of the spray holes 25 arrayed closer to the center line 100 are greater in number than the others to concentrate a spray of fuel on a left side of the area 28 of a right one of the intake valves 150.

The spray plate 13, as can be seen from FIG. 13(*b*), has the twelve spray holes 25 in total. Taking, as an example, the left group 38, the six spray holes 25, as labeled A, B, C, D, E, and F, are designed to aim at target spots x, as labeled A, B, C, D, E, and F, on the area 28 on the head 15 of the left intake valve 150, respectively. The target spot, as referred to herein, is a small area of the surface of the head 15 of the intake valve 150 in which a jet of fuel from each of the spray holes 25 concentrates most in flow rate, in other words, on which the center line of a stream of spray of fuel from each of the spray holes 15 hits.

Specifically, in the left group 38, four, as labeled E, C, D, and F, of the spray holes 25 are aligned parallel to the center line 100 so as to jet the fuel to the target spots E, C, D, and F on the area 28 of the left intake valve 150. Two, as labeled A and B, of the spray holes 25 are aligned parallel to and far from the center line 100 so as to jet the fuel to the target spots A and B on the area 28 of the left intake valve 150. The same is true for the right group 39.

Figure 14A:
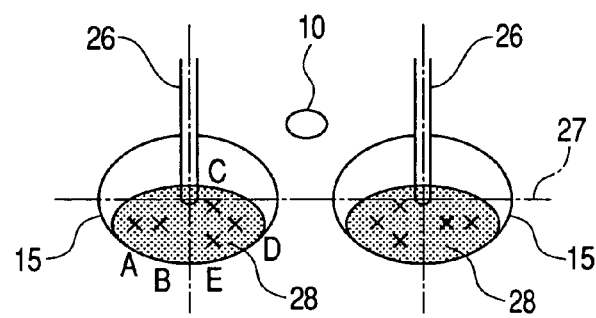
FIG. 14(a) is a schematic perspective view which shows target spots to which spray holes of a modification of a fuel injector of the fifth embodiment of the invention aim at directing jets of fuel.
Figure 14B:
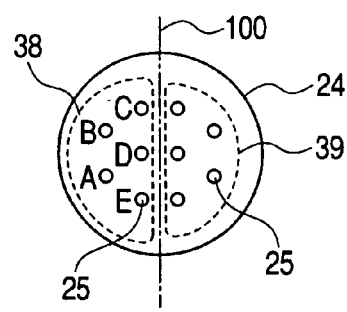
FIG. 14(b) is a plan view which shows modified layout of spray holes of a fuel injector of the fifth embodiment of the invention.

FIGS. 14(*a*) and 14(*b*) show another example of the fuel injection valve 18 of the fifth embodiment in which the spray plate 24 has a total of ten spray holes 25 formed therein. Specifically, taking, as an example, the left group 38, it is made up of five, as labeled A, B, C, D, and E, of the spray holes 25 designed to aims at target spots x, as labeled A, B, C, D, and E, on the area 28 of the left intake valve 150. Three, as labeled C, D, and E, of the five spray holes 25 are aligned parallel to and close to the center line 100 so as to jet the fuel to the target spots C, D, and E on the area 28 of the left intake valve 150. Two, as labeled A and B of the spray holes 25 are aligned parallel to and far from the center line 100 so as to jet the fuel to the target spots A and B on the area 28 of the left intake valve 150. The same is true for the right group 39.

The spray holes 25 of the fuel injection valve 18, as illustrated in FIGS. 13(*a*) and 13(*b*) or FIGS. 14(*a*) and 14(*b*), are designed to produce sprays of fuel so that they hit on the areas 28 of the heads 15 of the intake valves 150 and have, like the fourth embodiment, the maximum flow rate in narrow ranges defined around lines (i.e., the lines 33 and 34 in FIG. 11) extending between the centers of the first and second groups 38 and 39 (i.e., the center lines of streams of spray of fuel) and the base ends of the stems 26 of the intake valves 150 (i.e., the joints between the stems 26 and the heads 15 of the intake valves 150). This causes most of fuel sprayed to each of the intake valves 15 to hit on the stem 26 without directly entering the combustion chamber 12.

The fuel injection valve 18 of the fifth embodiment thereof may be designed to jet the fuel onto the areas 28*a* and 28*b* of the intake valves 15, as defined in the second embodiment and also have the air assist feature or the heating feature, as discussed in the third embodiment.

The fuel injection valve 18 according to the sixth embodiment of the invention will be described with reference to FIGS. 15(*a*), 15(*b*), and 15(*c*) which is similar to the first embodiment except as referred to below.

The spray plate 24 has twelve spray holes 25 arrayed in either of patterns, as illustrated in FIGS. 15(*b*) and 15(*c*). Pitches between the spray holes 25 may be equal to or different from each other. Ones of the spray holes 25 which aim at portions of the areas 28 on the heads 15 of the intake valves 150 closer to the center of the combustion chamber 12, in other words, closer to each other than the stems 26 are so designed as to orient jets of fuel to target spots x defined on the areas 28 at a shorter pitch in a direction parallel to the boundary line 27. In other words, angles which longitudinal center lines of ones of the spray holes 25 (i.e., lines of streams of spray of fuel from the spray holes 25) aiming at the portions of the areas 28 closer to each other than the stems 26 of the intake valves 150 make with the longitudinal center line of the fuel injection valve 18 are so selected as to orient jets of fuel to the target spots x defined on the areas 28 at the shorter pitch in the direction parallel to the boundary line 27.

Taking, as an example, the left group 38, three, as labeled D, E, and F, of the spray holes 25 are geometrically designed to produce and orient jets of fuel to the target spots D, E, and F defined on the right side, as viewed from the fuel injection valve 18, in the area 28 of the head 15 of the left intake valve 150 at shorter pitches in a direction parallel to the boundary line 27. Other three, as labeled A, B, and C, of the spray holes 25 are geometrically designed so as to produce and orient jets of fuel to the target spots A, B, and C defined on the left side in the area 28 of the head 15 of the left intake valve 150 at longer pitches in the direction parallel to the boundary line 27. The same is true for the right group 39.

FIGS. 16(*a*) and 16(*b*) show a modification of the fuel injection valve 18, as described above, in which the spray plate 24 has a total of eight spray holes 25 formed therein. Specifically, taking, as an example, the left group 38, it is made up of four, as labeled A, B, C, and D, of the spray holes 25 which are designed to aim at target spots x, as labeled A, B, C, and D, on the area 25 of the left intake valve 150. Of the spray holes 25, two, as labeled C and D, located closer to the center line 100 are designed so as to produce and orient jets of fuel to the target spots C and D defined on the area 28 of the left intake valve 150 at a shorter pitch. The other two spray holes 25, as labeled A and B, located far from the center line 100 are designed to produce and orient jets of fuel to the target spots A and B defined on the area 28 of the left intake valve 150 at a longer pitch. The same is true for the right group 39.

The spray holes 25 of the fuel injection valve 18, as illustrated in FIGS. 15(*a*), 15(*b*), and FIG. 15(*c*) or FIGS. 16(*a*) and 16(*b*), are designed to produce sprays of fuel so that they hit on the areas 28 of the heads 15 of the intake valves 15 and have, like the fourth embodiment, the maximum flow rate in narrow ranges defined around lines (i.e., the lines 33 and 34 in FIG. 11) extending between the centers of the first and second groups 38 and 39 (i.e., the center lines of streams of spray of fuel) and the base ends of the stems 26 of the intake valves 150. This causes most of fuel sprayed to each of the intake valves 15 to hit on the stem 26 without directly entering the combustion chamber 12.

The fuel injection valve 18 of the sixth embodiment may be designed to jet the fuel onto the areas 28*a* and 28*b* of the intake valves 15, as defined in the second embodiment and also have the air assist feature or the heating feature, as discussed in the third embodiment.

Figure 17A:
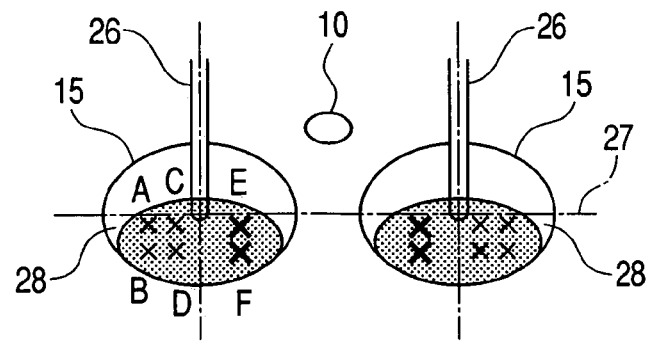
FIG. 17(a) is a schematic perspective view which shows target spots to which spray holes of a fuel injector according to the seventh embodiment of the invention aim at directing jets of fuel.
Figure 17B:
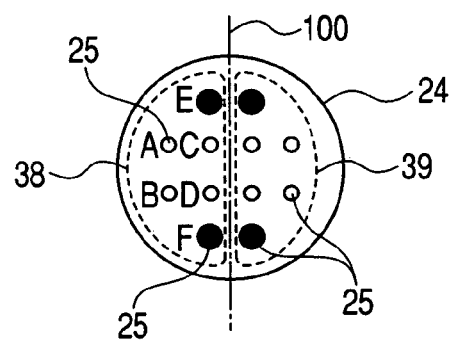
FIG. 17(b) is a plan view which shows layout of spray holes of a fuel injector aiming at the target spots, as illustrated in FIG. 17(a)

The fuel injection valve 18 according to the seventh embodiment of the invention will be described with reference to FIGS. 17(a) and 17(b) which is similar to the first embodiment except as referred to below.

The spray plate 24 has twelve spray holes 25 broken down into the left and right groups 38 and 39 across the center line 100 and designed to have ones of the spray holes 25 which are provided to aim at target spots x defined on the right side of the areas 28 of the heads 15 of the intake valves 150, as viewed from the fuel injection valve 18, and have a larger diameter.

Taking, as an example, the left group 38, outermost two, as labeled E and F, of the six spray holes 25 are geometrically designed to produce and orient jets of fuel to the target spots E and F defined on the right side, as viewed from the fuel injection valve 18, in the area 28 of the left intake valve 150 and to have a larger diameter. Other four, as labeled A, B, C, and D, of the spray holes 25 are geometrically designed to produce and orient jets of fuel to the target spots A, B, C, and D defined on the left side in the area 23 of the left intake valve 150 and to have a smaller diameter. The same is, as can be seen from FIGS. 17(a) and 17(b), true for the right group 39. Three of more of the spray holes 25 may be designed to have a larger diameter.

Figure 18A:
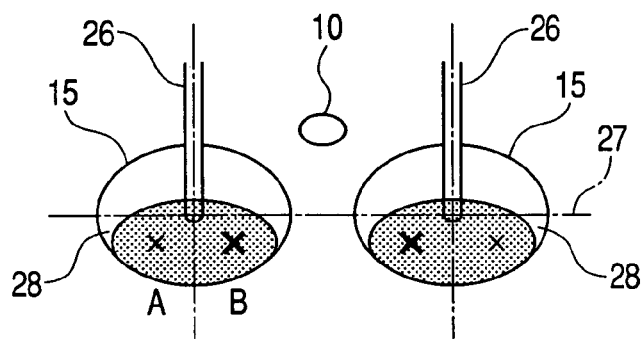
FIG. 18(a) is a schematic perspective view which shows target spots to which spray holes of a fuel injector in a modified form of the seventh embodiment of the invention aim at directing jets of fuel.
Figure 18B:
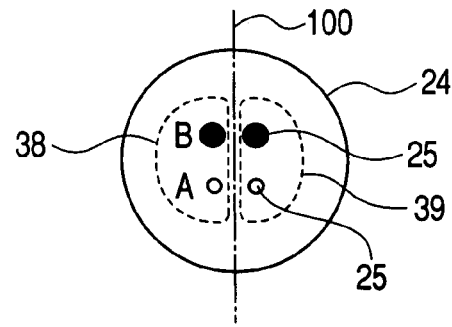
FIG. 18(b) is a plan view which shows layout of spray holes of a fuel injector aiming at the target spots, as illustrated in FIG. 18(a)

FIGS. 18(a) and 18(b) show a modification of the fuel injection valve 18, as described above, in which the spray plate 24 has a total of four spray holes 25 formed therein. Specifically, taking, as an example, the left group 38, it is made up of two, as labeled A, and B, of the spray holes 25 designed to aim at target spots x, as labeled A and B, defined on the area 28 of the heads 15 of the left intake valve 150, respectively. Of the spray holes 25, one, as labeled B, is designed to produce and orient a jet of fuel to the target spot B defined closer to the center of the combustion chamber 12 and to have a larger diameter. The other one spray hole 25, as labeled A, is designed to produce and orient a jet of fuel to the target spot A defined far from the center of the combustion chamber 12 and to have a smaller diameter. The same is, as can be seen from the drawings, true for the right group 39.

FIGS. 19(a) and 19(b) show the second modification of the fuel injection valve 18, as described above, in which the spray plate 24 has a total of six spray holes 25 formed therein.

Specifically, taking, as an example, the left group 38, it has three, as labeled A, B, and C, of the spray holes 25 which are designed to aim at target spots x, as labeled A, B, and C, defined on the area 25 of the head 15 of the left intake valve 150, respectively. Of the spray holes 25, one, as labeled C, is designed to produce and orient a jet of fuel to the target spot C defined on the right side of the stem 26 and to have a larger diameter. The other two spray hole 25, as labeled A and B, are designed to produce and orient jets of fuel to the target spots A and B defined on the left side of the stem 26 and to have a smaller diameter. The same is, as can be seen from the drawings, true for the right group 39.

The spray holes 25 of the fuel injection valve 18, as illustrated in FIGS. 17(a) and 17(b), FIGS. 18(a) and 18(b), and FIGS. 19(a) and 19(b), are designed to produce sprays of fuel so that they hit on the areas 28 of the intake valves 15 and have, like the fourth embodiment, the maximum flow rate in narrow ranges defined around lines (i.e., the lines 33 and 34 in FIG. 11) extending between the centers of the first and second groups 38 and 39 (i.e., the center lines of streams of spray of fuel) and the base ends of the stems 26 of the intake valves 150. This causes most of fuel sprayed to each of the intake valves 15 to hit on the stem 26 without directly entering the combustion chamber 12.

The fuel injection valve 18 of the seventh embodiment may be designed to jet the fuel onto the areas 28a and 28b of the intake valves 15, as defined in the second embodiment and also have the air assist feature or the heating feature, as discussed in the third embodiment.

The fuel injection valve 18 according to the eighth embodiment of the invention will be described with reference to FIGS. 20 and FIGS. 21(a), 22(b), and 21(c) which is similar to the first embodiment except as referred to below.

Figure 21A:
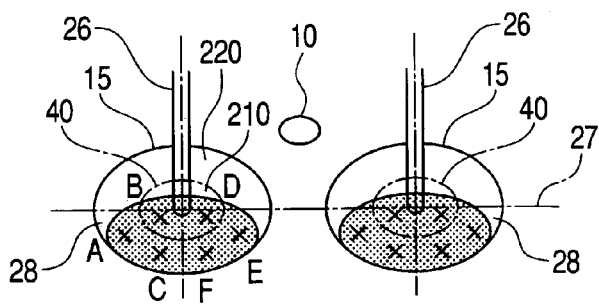
FIG. 21(a) is a schematic perspective view which shows target spots to which spray holes of a fuel injector of the eighth embodiment of the invention aim at directing jets of fuel.

The fuel injection valve 18 is designed to spray the fuel, as clearly shown in FIGS. 20 and 21(a), to an inner peripheral area 210 and an outer peripheral area 220 of the surface of each of the heads 15 of the intake valves 150. The inner and outer peripheral areas 210 and 220 are demarcated by a reference circle 40 defined around the center (i.e., an intersection between the boundary line 27 and the longitudinal center line 300 of the stem 26) of the head 15 of each of the intake valves 150. The reference circle 40 has a diameter that is half a diameter D of a circular area derived by omitting an outermost annular area 46 from an entire surface area of the head 15 of the intake valve 150. The annular area 46 is an area on the head 15 of the intake valve 150 which works as a seat that is to abut an open end of the inner wall of the intake manifold 17 defining the intake port 13 when the intake valve 150 is closed. In other words, the annular area 46 is a peripheral portion of the surface of the head 15 of the intake valve 150 not exposed directly to the intake port 13 when the intake valve 150 is closed.

The fuel injection valve 18 has a plurality of spray holes 25 at least one of which is provided to aim at directing a jet of fuel to the inner peripheral area 210 and more than half of which are provided to aim at directing jets of fuel to the outer peripheral area 220. The fuel injection valve 18 is, like the first embodiment, also designed to produce sprays of fuel, one for each of the intake ports 13, so that approximately 70% or more of the amount of each of the sprays of fuel per fuel injection hits on a corresponding one of the areas 28 of the heads 15 of the intake valves 150 when the fuel injection valve 18 is in the intake asynchronous injection mode.

Figure 21B:
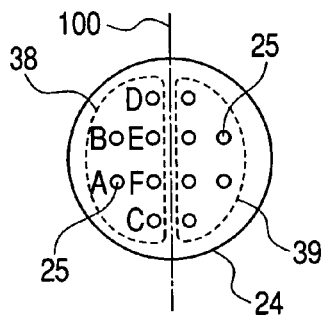
FIG. 21(b) is a plan view which shows layout of spray holes of a fuel injector of the eighth embodiment of the invention aiming at the target spots, as illustrated in FIG. 21(a)
Figure 21C:
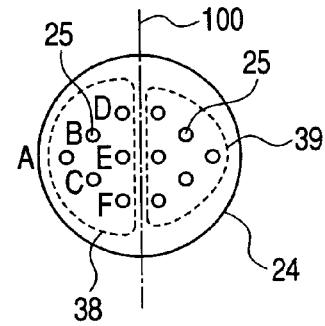
FIG. 21(c) is a plan view which shows a modified layout of spray holes of a fuel injector of the eighth embodiment of the invention aiming at target spots, as illustrated in FIG. 21(a)

The spray plate 24 of the fuel injection valve 18 may have a plurality of spray holes 25 arrayed in a pattern, as illustrated either in FIG. 21(b) or in FIG. 21(c). In the example of either of FIG. 21(b) and FIG. 21(c), the twelve spray holes 25 are, like the ones in FIG. 12, broken down into the left and right groups 38 and 39 and designed to produce and orient jets of fuel to target spots x on the surfaces of the heads 15 of the right and left intake valves 150.

Taking, as an example, the left group 38, outer two, as labeled B and D, of the six spray holes 25 are geometrically designed to produce and orient jets of fuel to the target spots B and D defined in the inner peripheral area 210 of the head 15 of the left intake valve 150. Other four, as labeled A, C, E, and F, of the spray holes 25 are geometrically designed to produce and orient jets of fuel to the target spots A, C, E, and F defined in the outer peripheral area 220 of the head 15 of the left intake valve 150. The same is, as can be seen from the drawings, true for the right group 39.

Figure 22A:
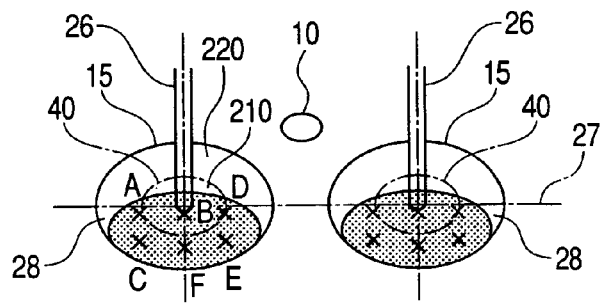
FIG. 22(a) is a schematic perspective view which shows target spots to which spray holes of a fuel injector in a modified form of the eighth embodiment of the invention aim at directing jets of fuel.
Figure 22B:
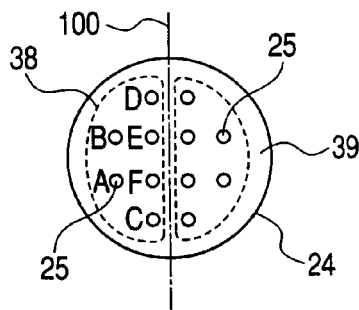
FIG. 22(b) is a plan view which shows layout of spray holes of a fuel injector aiming at the target spots, as illustrated in FIG. 22(a)

Each of the left and right groups 38 and 39 may alternatively, as illustrated in FIGS. 22(a) and 22(b), have one, as labeled D, of the spray holes 25 which is designed to produce and orient a jet of fuel to the target spot D defined on the reference circular 40 defining the boundary between the inner and outer peripheral areas 210 and 240.

Figure 23A:
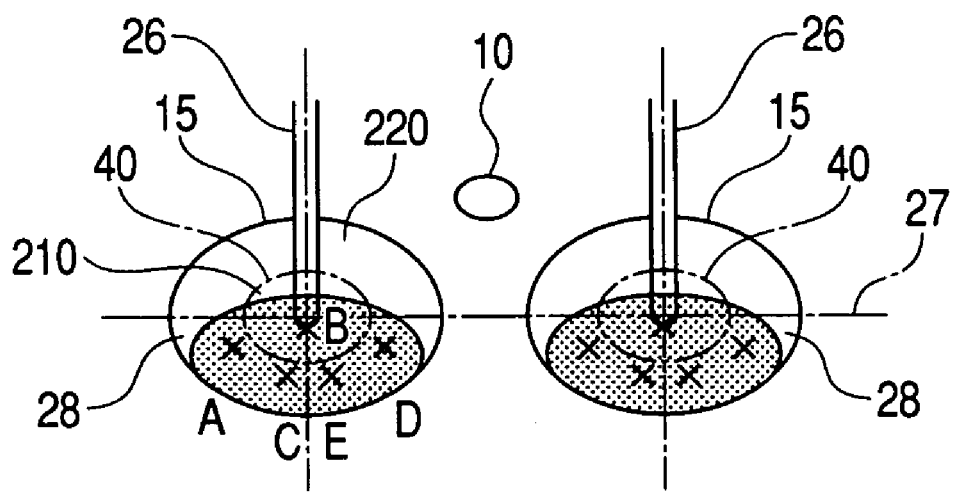
FIG. 23(a) is a schematic perspective view which shows target spots to which spray holes of a fuel injector in a modified form of the eighth embodiment of the invention aim at directing jets of fuel.
Figure 23B:
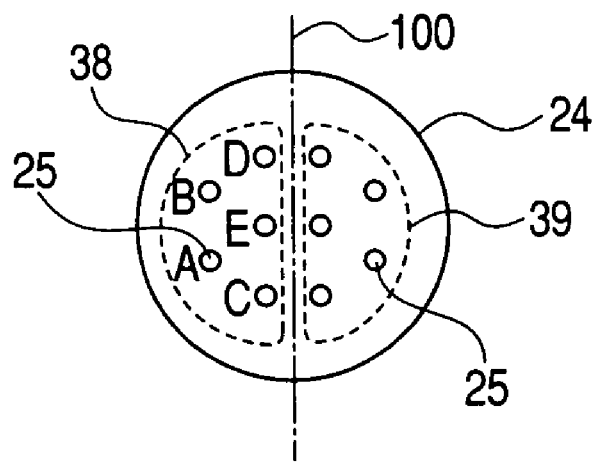
FIG. 23(b) is a plan view which shows layout of spray holes of a fuel injector aiming at the target spots, as illustrated in FIG. 23(a)

FIGS. 23(a) and 23(b) show another modification of the spray plate 24 of the fuel injection valve 18, as described above.

The spray plate 24, as clearly illustrated in FIG. 23(b), has a total of ten spray holes 25 which are broken down into the right and left groups 38 and 39.

Taking, as an example, the left group 38, one, as labeled B, of the five spray holes 25 is designed to produce and orient a jet of fuel to the inner peripheral area 210 of the head 15 of the intake valve 150 The other four spray holes 25, as labeled A, C, D, and E, are designed to produce and orient jets of fuel to the outer peripheral area 220.

Figure 24A:
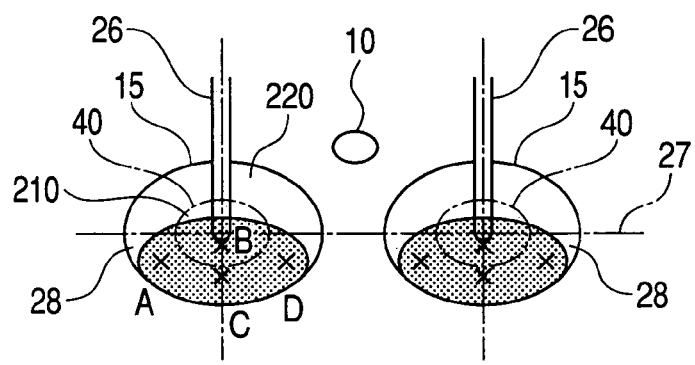
FIG. 24(a) is a schematic perspective view which shows target spots to which spray holes of a fuel injector in a second modified form of the eighth embodiment of the invention aim at directing jets of fuel.
Figure 24B:
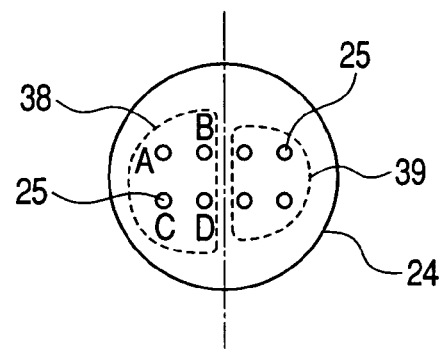
FIG. 24(*b*) is a plan view which shows layout of spray holes of a fuel injector aiming at the target spots, as illustrated in FIG. 24(*a*)

FIGS. 24(a) and 24(b) show a further modification of the spray plate 24 of the fuel injection valve 18, as described above.

The spray plate 24, as clearly illustrated in FIG. 24(b), has a total of eight spray holes 25 which are broken down into the right and left groups 38 and 39.

Taking, as an example, the left group 38, one, as labeled B, of the four spray holes 25 is designed to produce and orient a jet of fuel to the inner peripheral area 210 of the head 15 of the intake valve 150. The other three spray holes 25, as labeled A, C, and D, are designed to produce and orient jets of fuel to the outer peripheral area 220.

Figure 25A:
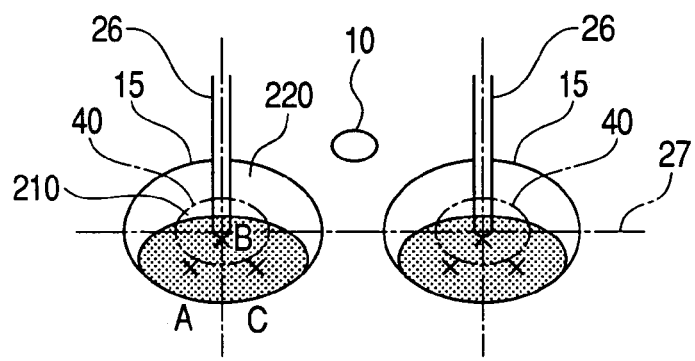
FIG. 25(*a*) is a schematic perspective view which shows target spots to which spray holes of a fuel injector in a third modified form of the eighth embodiment of the invention aim at directing jets of fuel.
Figure 25B:
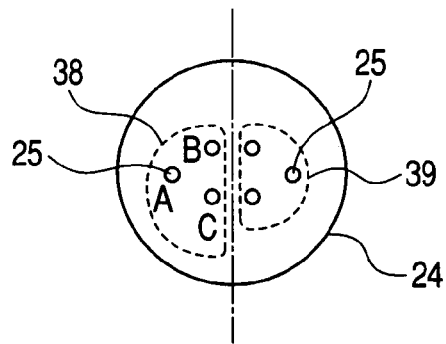

FIGS. 25(a) and 25(b) show a still further modification of the spray plate 24 of the fuel injection valve 18, as described above.

The spray plate 24, as clearly illustrated in FIG. 25(b), has a total of six spray holes 25 which are broken down into the right and left groups 38 and 39.

Taking, as an example, the left group 38, one, as labeled B, of the four spray holes 25 is designed to produce and orient a jet of fuel to the inner peripheral area 210 of the heed 15 of the intake valve 150. The other two spray holes 25, as labeled A and C, are designed to produce and orient jets of fuel to the outer peripheral area 220.

As apparent from the above discussion, the fuel injection valve 18 of this embodiment works to spray a large amount of fuel to a peripheral portion of the area 28 on the surface of the head 15 of each of the intake valves 150, thereby minimizing wetting of the inner wall of the intake ports 13 with fuel in the intake asynchronous injection mode. This facilitates entrance of much fuel staying on the heads 15 of the intake valves 150 into the combustion chamber 12 upon start of the intake synchronous injection mode. Further, in the intake synchronous injection mode wherein the intake valves 150 are opened, and the fuel is sprayed into the combustion chamber 12, air flows in the intake ports 13, as described above, cause streams of the fuel to be shifted toward the exhaust valves 160. The fuel injection valve 18 of this embodiment, however, works to avoid great shifts of the streams of fuel toward the exhaust valves 160, thereby minimizing adhesion of the fuel to the inner wall of the combustion chamber 12 near the exhaust ports 14 during the intake synchronous injection mode and thus suppressing an increase in HC emissions.

The fuel injection valve 18 of the eighth embodiment may alternatively be designed to jet the fuel onto the areas 28a and 28b of the intake valves 15, as defined in the second embodiment and also have the air assist feature or the heating feature, as discussed in the third embodiment.

The fuel injection valve 18 according to the ninth embodiment of the invention will be described with reference to FIGS. 26(a) to 29(b) which is similar to the first embodiment except as referred to below.

Figure 26A:
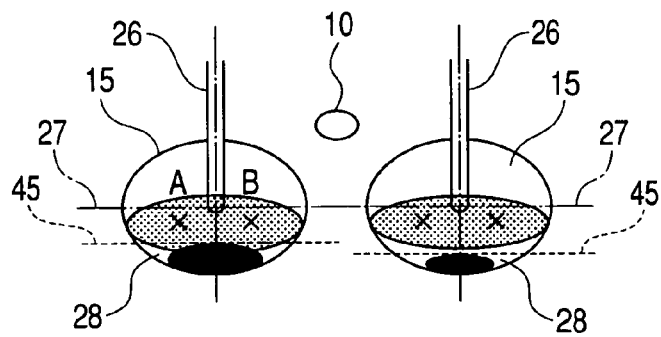
FIG. 26(*a*) is a schematic perspective view which shows target spots to which spray holes of a fuel injector according to the ninth embodiment of the invention aim at directing jets of fuel.
Figure 27A:
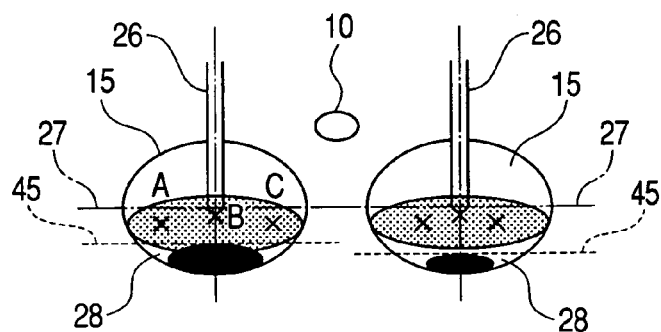
FIG. 27(*a*) is a schematic perspective view which shows target spots to which spray holes of a fuel injector in a modified form of the ninth embodiment of the invention aim at directing jets of fuel.

The fuel injection valve 18 of this embodiment is so designed that all the spray holes 25 produce and orient jets of fuel to inside ranges between the reference boundary line 27, as defined above, extending through the centers of the base ends of the stems 26 of the intake valves 150 and reference lines 45, one defined for each of the intake valves 150. Each of the reference lines 45 is a line extending parallel to the reference boundary line 27 and tangent to the perimeter of an area, as painted black in the drawing, on the surface of the head 15 of a corresponding one of the intake valves 150 which is interrupted by the inner wall of the intake port 13 so that it is invisible from the center of a fuel jetting from the fuel injection valve 18. FIGS. 26(a) and 27(a) illustrate an example in which the areas on the heads 15 of the intake valves 150 interrupted by the inner walls of the right and left intake ports 13 are different in size from each other due to, for example, the location of the fuel injection valve 18 and/or the three-dimensional shape of the intake manifold 17.

The fuel injection valve 18 of this embodiment is, like the first embodiment, also designed to produce sprays of fuel, one for each of the intake ports 13, so that approximately 70% or more of the amount of each of the sprays of fuel per fuel injection hits on a corresponding one of the areas 28 of the heads 15 of the intake valves 150 when the fuel injection valve 18 is in the intake asynchronous injection mode.

Figure 26B:
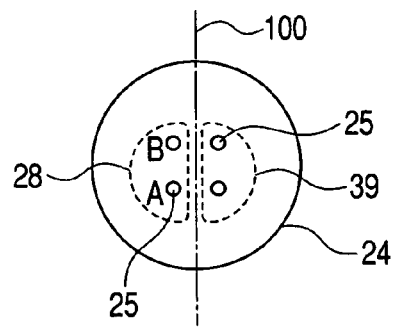
Figure 27B:
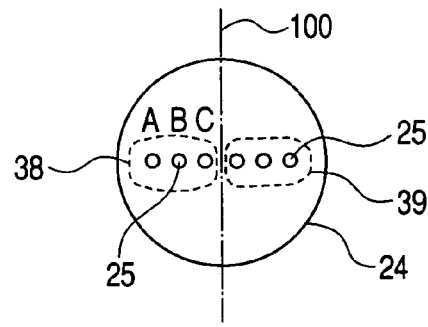
Figure 28A:
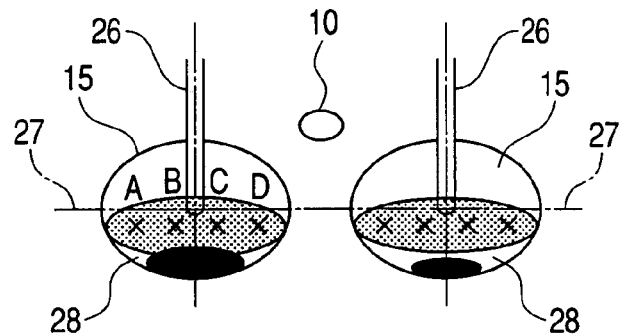
FIG. 28(*a*) is a schematic perspective view which shows target spots to which spray holes of a fuel injector in a second modified form of the ninth embodiment of the invention aim at directing jets of fuel.
Figure 28B:
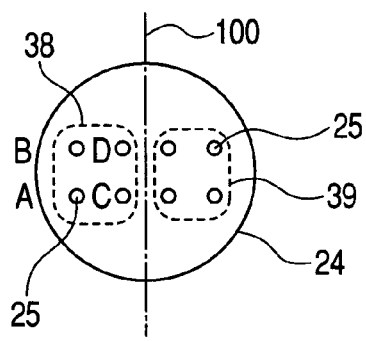
Figure 29A:
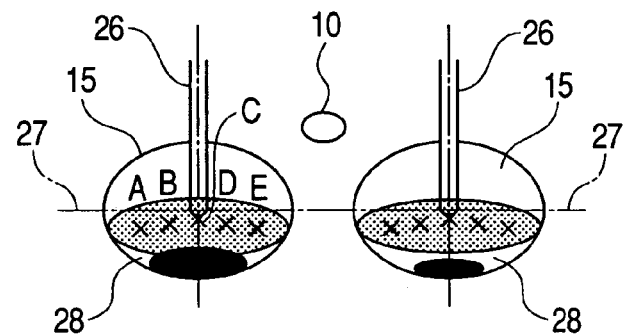
FIG. 29(*a*) is a schematic perspective view which shows target spots to which spray holes of a fuel injector in a third modified form of the ninth embodiment of the invention aim at directing jets of fuel.
Figure 29B:
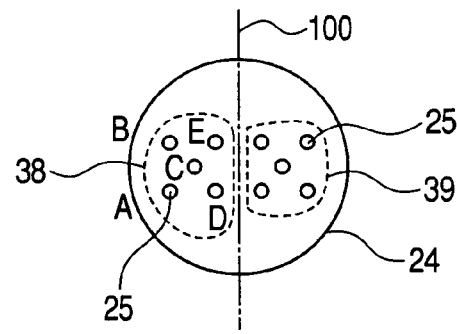

The spray plate 24 of the fuel injection valve 18 may have a plurality of spray holes 25 arrayed in a pattern, as illustrated in, for example, any one of FIGS. 26(b), 27(b), 28(b), and 29(b). FIGS. 27(a) to 27(c) illustrate the case where the spray plate 24 has a total of six spray holes 25. FIGS. 28(a) to 28(c) illustrate the case where the spray plate 24 has a total of eight spray holes 25. FIGS. 29(a) to 29(c) illustrate the case where the spray plate 24 has a total of ten spray holes 25.

In the case of FIGS. 26(a) to 26(c), the spray holes 25 are, like the ones in FIG. 12, broken down into the left and right groups 38 and 39 and designed to produce and orient jets of fuel to target spots × on the surfaces of the heads 15 of the right and left intake valves 150. Specifically, taking, as an example, the left group 38, all the two spray holes 25, as labeled A and B, are geometrically designed to produce and orient jets of fuel to the target spots A and B defined in the range between the reference lines 27 and 46 within the area 28. The same is, as can be seen from the drawing, true for to the right group 39.

The fuel injection valve 18 of this embodiment works to spray a large amount of fuel to the area 28 on the surface of the head 15 of each of the intake valves 150 close to the bottom wall of the intake manifold 17 without wetting portions of the inner wall of the intake manifold 17 with much fuel in the intake asynchronous injection mode. This facilitates entrance of much fuel staying on the heads 15 of the intake valves 150 into the combustion chamber 12 upon start of the intake synchronous injection mode. Further, in the intake synchronous injection mode wherein the intake valves 150 are opened, and the fuel is sprayed into the combustion chamber 12, air flows in the intake ports 13, as described above, cause streams of the fuel to be shifted toward the exhaust valves 160. The fuel injection valve 18 of this embodiment, however, works to avoid great shifts of the streams of fuel toward the exhaust valves 160, thereby minimizing adhesion of the fuel to the inner wall of the combustion chamber 12 near the exhaust ports 14 during the intake synchronous injection mode and thus suppressing an increase in HC emissions.

The fuel injection valve 18 of the ninth embodiment may alternatively be designed to jet the fuel onto the areas 28a and 28b of the intake valves 15, as defined in the second embodiment and also have the air assist Feature or the heating feature, as discussed in the third embodiment.

Figure 30A:
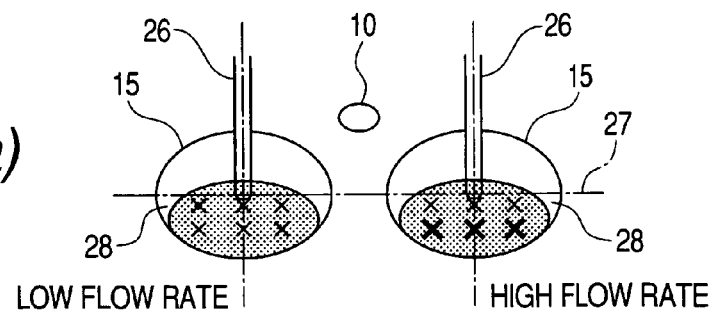
FIG. 30(*a*) is a schematic perspective view which shows target spots to which spray holes of a fuel injector according to the tenth embodiment of the invention aim at directing jets of fuel.

The fuel injection valve 18 according to the tenth embodiment will be described below with reference to FIGS. 30(a) and 30(b) which is similar to the first embodiment except as referred to below.

When distances between the centers of fuel jettings from the fuel injection valve 18 and the right and left intake ports 13 (i.e., the surfaces of the heads 15 of the intake valves 150) are different from each other or the right and left intake ports 13 are different in shape or size from each other, it may cause sprays of fuel entering the combustion chamber 12 from the right and left intake ports 13 to differ from each other in flow rate of fuel per fuel injection cycle, thereby resulting non-uniformity in distribution of the fuel within the combustion chamber 12 which leads to misfire or deterioration of exhaust emissions of the engine 11.

In order to avoid the above problem, the fuel injection valve 18 of this embodiment is designed to have a plurality of spray holes 25 one or same of which are shaped to produce jets of fuel different in flow rate from the others. The fuel injection valve 18 is, like the first embodiment, also designed to produce sprays of fuel, one for each of the intake ports 13, so that approximately 70% or more of the amount of each of the sprays of fuel per fuel injection hits a corresponding one of the areas 28 of the heads 15 of the intake valves 150 when the fuel injection valve 18 is in the intake asynchronous injection mode.

Figure 30B:
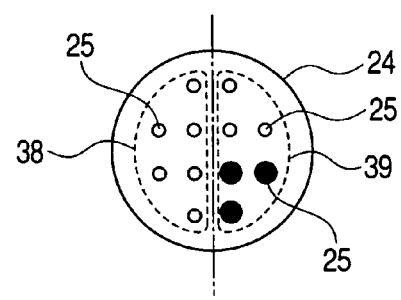

FIG. 30(b) illustrates an example wherein the spray plate 24 of the fuel injection valve 18 has a total of twelve spray holes 25 and is designed to produce a spray of fuel for a right one of the intake ports 13, as viewed in the drawing, which is greater in amount or flow rate per fuel injection cycle than that for a left one of the intake ports 13. Specifically, three, as painted black, of the spray holes 25 of the right group 39 have a diameter greater than that of the spray holes 25 of the left group 38 to spray fuel to the area 28 of the head 15 of the right intake valve 150 which is greater in amount or flow rate than that sprayed from the left group 38.

The fuel injection valve 18 of the tenth embodiment may alternatively be designed to jet the fuel onto the areas 28a and 28b of the intake valves 15, as defined in the second embodiment and also have the air assist feature or the heating feature, as discussed in the third embodiment.

Figure 31A:
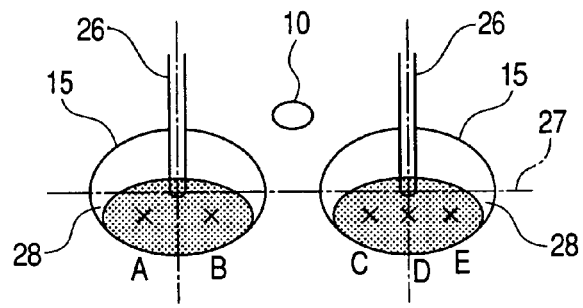
FIG. 31(*a*) is a schematic perspective view which shows target spots to which spray holes of a fuel injector according to the eleventh embodiment of the invention aim at directing jets of fuel.
Figure 31B:
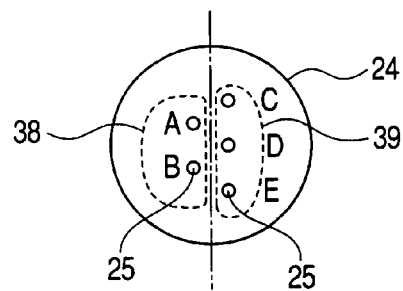

The fuel injection valve 18 according to the eleventh embodiment will be described below with reference to FIG. 31 which is a modification of the tenth embodiment.

Specifically, the fuel injection valve 18 of this embodiment is designed to have one of the left and right groups 38 and 39 that is greater in number of the spray holes 25 to spray fuel to the area 28 of a preselected one of the intake valves 150 which is greater in amount or flow rate than that sprayed from the other.

Other arrangements are identical with those in the tenth embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims. For instance, the fuel injection valve 18 of any one of the above embodiments may be employed in internal combustion engines equipped with one or more than two intake valves for each cylinder.

The number or layout of the spray holes 25 formed in the spray plate 24 are not limited to that, as described in each of the embodiments.

What is claimed is:

1. A fuel injector for an internal combustion engine comprising:
    an injector body having a fuel outlet; and
    a spray hole formed in the fuel outlet, said spray hole being geometrically designed to produce a spray of fuel in a predetermined pattern so that substantially 70% or more of an amount of the spray hits a preselected area on a surface of a head of an intake valve of an engine when the intake valve is closed, the preselected area being one of a first and a second area on the surface of the head of the intake valve which are defined on respective sides of a reference boundary line extending through a joint of the head of the intake valve with a stem of the intake valve, the first area being closer to an intake manifold of the engine, the second area being closer to an exhaust valve of the engine, the preselected area being the first area,
    wherein a pattern defined on the surface of the head of the intake valve by the spray of fuel emitted from said spray hole has a first length and a second length, the first length extending in a forward advancing direction in which the spray of fuel is emitted from the spray hole on the surface of the head of the intake valve, the second length extending perpendicular to the direction of the first length and being longer than the first length.

2. A fuel injector as set forth in claim 1, wherein a plurality of spray holes are formed in the fuel outlet, and wherein the predetermined pattern of the spray of fuel is established by setting at least one of layout of the spray holes at the fuel outlet, an angular direction in which a jet of the fuel is outputted from each of the spray holes, a diameter of each of the spray holes, and a pitch between adjacent two of target spots on the preselected area of the head of the intake valve each of which one of the spray holes aims at directing a central portion of the jet of fuel which is the greatest in flow rate of fuel.

3. A fuel injector as set forth in claim 2, wherein if the surface of the head of the intake valve is broken down into an inner peripheral area and an outer peripheral area demarcated by a reference circle which is defined around a center of the head of the intake valves and has a diameter that is half a diameter of a circular area derived by omitting, from an entire surface area of the head of the intake valve, an outermost annular area that is an area on the head of the intake valve which works as a seat that is to abut an open end of an inner wall of the intake manifold defining the intake port when the intake valve is closed, at least one of said spray holes are designed to aim at producing and directing a jet of fuel to the inner peripheral area, while more than half all said spray holes are provided to aim at directing jets of fuel to the outer peripheral area.

4. A fuel injector as set forth in claim 2, wherein all said spray holes are geometrically designed to produce and orient jets of fuel to inside ranges between the reference boundary line and a reference line which extends parallel to the reference boundary line and tangent to a perimeter of an area on the surface of the head of the intake valves which is interrupted by an inner wall of the intake port so that the area is invisible from a center of a fuel jetting from the fuel outlet.

5. A fuel injector as set forth in claim 2, wherein said spray holes are geometrically designed to produce two sprays of fuel, one for each of two inlet ports of a combustion chamber in a cylinder of the engine which are selectively closed by heads of intake valves, respectively.

6. A fuel injector as set forth in claim 5, wherein each of the head of the intake valves has the preselected area, the preselected area of a left one of the heads of the intake valves, as viewed from the fuel outlet of said injector body, being delimited by said reference boundary line that is located at an angular interval 10° to 30 ° away from a reference line in a clockwise direction, as viewed from the fuel outlet, the preselected area of a right one of the heads of the intake valves, as viewed from the fuel outlet of said injector body, being delimited by said reference boundary line that is located at an angular interval 10° to 30° away from a reference line in a counterclockwise direction, as viewed from the fuel outlet.

7. A fuel injector as set forth in claim 6, wherein the spray holes are broken down into a first group and a second group, each of the first and second groups being so designed to produce the spray of fuel for one of the intake ports of the combustion chamber of the engine that a portion of the spray has a maximum flow rate within a range defined around a line extending between the joint of the head of the intake valve with the stem of the intake valve and a center of a fuel jetting of a corresponding one of the first and second groups.

8. A fuel injector as set forth in claim 7, wherein the first group of the spray holes is designed to produce and orient the spray of fuel to the head of a left one of the intake valves, as viewed from the fuel outlet, and the second group of the spray holes is designed to produce and orient the spray of fuel to the head of a right one of the intake valves, and wherein the first group has ones of the spray holes which are provided to aim at a right side of the preselected area, as viewed from the fuel outlet, and greater in number than remaining ones of the spray holes, and the second group has ones of the spray holes which is provided to aim at a left side of the preselected area, as viewed from the fuel outlet, and greater in number than remaining ones of the spray holes.

9. A fuel injector as set forth in claim 7, wherein the first group of the spray holes is designed to produce and orient the spray of fuel to the head of a left one of the intake valves, as viewed from the fuel outlet, and the second group of the spray holes being designed to produce and orient the spray of fuel to the head of a right one of the intake valves, and wherein the first group has ones of the spray holes which are provided to aim at producing and directing jets of the fuel to target spots defined on a right side of the preselected area, as viewed from the fuel outlet, at a spot-to-spot pitch shorter than that in remaining one of the spray holes, and the second group has ones of the spray holes which are provided to aim at producing and directing jets of the fuel to target spots defined on a left side of the preselected area, as viewed from the fuel outlet, at a spot-to-spot pitch shorter than that in remaining one of the spray holes.

10. A fuel injector as set forth in claim 7, wherein the first group of the spray holes is designed to produce and orient the spray of fuel to the head of a left one of the intake valves, as viewed from the fuel outlet, and the second group of the spray holes being designed to produce and orient the spray of fuel to the head of a right one of the intake valves, and wherein the first group has ones of the spray holes which are provided to aim at producing and directing jets of the fuel to a right side of the preselected area, as viewed from the fuel outlet, and greater in diameter than remaining one of the spray holes, and the second group has ones of the spray holes which are provided to aim at producing and directing jets of the fuel to a left side of the preselected area, as viewed from the fuel outlet, and greater in diameter than remaining one of the spray holes.

11. A fuel injector as set forth in claim 5, wherein the spray holes are broken down into a first group and a second group, each of the first and second groups being so designed to produce the spray of fuel for one of the intake ports of the combustion chamber of the engine that a portion of the spray has a maximum flow rate within a range defined around a line extending between the joint of the head of the intake valve with the stem of the intake valve and a center of a fuel jetting of a corresponding one of the first and second groups.

12. A fuel injector as set forth in claim 11, wherein the first group of the spray holes is designed to produce and orient the spray of fuel to the head of a left one of the intake valves, as viewed from the fuel outlet, and the second group of the spray holes is designed to produce and orient the spray of fuel to the head of a right one of the intake valves, and wherein the first group has ones of the spray holes which are provided to aim at a right side of the preselected area, as viewed from the fuel outlet, and greater in number than remaining ones of the spray holes, and the second group has ones of the spray holes which is provided to aim at a left side of the preselected area, as viewed from the fuel outlet, and greater in number than remaining ones of the spray holes.

13. A fuel injector as set forth in claim 11, wherein the first group of the spray holes is designed to produce and orient the spray of fuel to the head of a left one of the intake valves, as viewed from the fuel outlet, and the second group of the spray holes is designed to produce and orient the spray of fuel to the head of a right one of the intake valves, and wherein the first group has ones of the spray holes which are provided to aim at producing and directing jets of the fuel to target spots defined on a right side of the preselected area, as viewed from the fuel outlet, at a spot-to-spot pitch shorter than that in remaining one of the spray holes, and the second group has ones of the spray holes which are provided to aim at producing and directing jets of the fuel to target spots defined on a left side of the preselected area, as viewed from the fuel outlet, at a spot-to-spot pitch shorter than that in remaining one of the spray holes.

14. A fuel injector as set forth in claim 11, wherein the first group of the spray holes is designed to produce and orient the spray of fuel to the head of a left one of the intake valves, as viewed from the fuel outlet, and the second group of the spray holes being designed to produce and orient the spray of fuel to the head of a right one of the intake valves, and wherein the first group has ones of the spray holes which are provided to aim at producing and directing jets of the fuel to a right side of the preselected area, as viewed from the fuel outlet, and greater in diameter than remaining one of the spray holes, and the second group has ones of the spray holes which are provided to aim at producing and directing jets of the fuel to a left side of the preselected area, as viewed from the fuel outlet, and greater in diameter than remaining one of the spray holes.

15. A fuel injector as set forth in claim 1, wherein a plurality of spray holes are formed in the fuel outlet and broken down into a plurality of spray hole groups which work to produce a plurality of sprays of fuel, one for each of a plurality of inlet ports of a combustion chamber in a cylinder of the engine, and wherein the sprays of fuel are different in flow rate from each other.

16. A fuel injector as set forth in claim 15, wherein one of the spray hole groups, which is so selected as to produce one of the sprays of fuel greater in the flow rate, has at least one of the spray holes which is greater in diameter than that in one of the other spray holes groups which is so selected as to produce the spray of fuel smaller in the flow rate.

17. A fuel injector as set forth in claim 15, wherein one of the spray hole groups, which is so selected as to produce one of the sprays of fuel greater in the flow rate, has ones of the spray holes which are greater in number than that in one of the other spray holes groups which is so selected as to produce the spray of fuel smaller in the flow rate.

18. A fuel injector as set forth in claim 1, wherein the second length is generally parallel to said reference boundary line.

19. A fuel injector for an internal combustion engine comprising:

an injector body having a fuel outlet; and a spray hole formed in the fuel outlet, said spray hole being geometrically designed to be controlled to emit a spray of fuel in a selected one of an intake synchronous injection mode in which the fuel is jetted into a cylinder of an engine in synchronization with an intake stroke of a piston of the cylinder and an intake asynchronous injection mode in which the fuel is jetted into the cylinder during closing of an intake valve regardless of stroke of the piston, in the intake asynchronous injection mode, the spray of fuel being emitted in a predetermined pattern so that substantially 70% or more of an amount of the spray hits a preselected area on a surface of a head of an intake valve of the engine when the intake valve is closed, the preselected area being one of a first and a second area on the surface of the head of the intake valve which are defined on respective sides of a reference boundary line extending through a joint of the head of the intake valve with a stem of the intake valve, the first area being closer to an intake manifold of the engine, the second area being closer to an exhaust valve of the engine, the preselected area being the first area, wherein a pattern defined on the surface of the head of the intake valve by the spray of fuel emitted from said spray hole in the intake asynchronous injection mode has a first length and a second length, the first length extending in a forward advancing direction in which the spray of fuel is emitted from the spray hole on the surface of the head of the intake valve, the second length extending perpendicular to the direction of the first length and being longer than the first length.

20. A fuel injector as set forth in claim 19, wherein the second length is generally parallel to said reference boundary line.

\* \* \* \* \*